United States Patent
Anderson et al.

(10) Patent No.: US 8,108,422 B2
(45) Date of Patent: *Jan. 31, 2012

(54) COMPLIANCE RULES ANALYTICS ENGINE

(75) Inventors: Randall Marvin Anderson, Bedford, NH (US); Said Tabet, Natick, MA (US); John Doulamis, Newton, MA (US); Rolando Rabines, Topsfield, MA (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/576,785

(22) Filed: Oct. 9, 2009

(65) Prior Publication Data

US 2010/0030718 A1    Feb. 4, 2010

Related U.S. Application Data

(63) Continuation of application No. 11/253,273, filed on Oct. 18, 2005, now Pat. No. 7,603,358.

(60) Provisional application No. 60/654,667, filed on Feb. 18, 2005.

(51) Int. Cl.
  *G06F 7/00*    (2006.01)
  *G06F 17/30*    (2006.01)

(52) U.S. Cl. .................................. 707/770; 706/47

(58) Field of Classification Search .......... 707/600–831; 706/47

See application file for complete search history.

(56) References Cited

U.S. PATENT DOCUMENTS 5,987,440 A * 11/1999 O'Neil et al. ................. 705/44
6,430,545 B1 * 8/2002 Honarvar et al. ............. 706/47

OTHER PUBLICATIONS

Forgy, C.L., Rete: A Fast Algorithm for the Many Pattern/Many Object Pattern Match Problem, 1982, North-Holland, 17-37.*
Yannakopoulos et al., Object lessons learned from an intelligent agents framework for telephony-based applications, Aug. 1-5, 1999, IEEE, 222-236.*
Ceri et al., Effective scheduling of detached rules in active databases, Jan.-Feb. 2003, IEEE, Vol.15 Issue 1, 2-13.*

* cited by examiner

*Primary Examiner* — Jean B Fleurantin
(74) *Attorney, Agent, or Firm* — Slater & Matsil, L.L.P.

(57) ABSTRACT

The present invention relates to compliance rules analytics systems and methods for facilitating compliance, such as the compliance of an investment portfolio or a set of investment portfolios, with a rule or a set of rules.

4 Claims, 12 Drawing Sheets

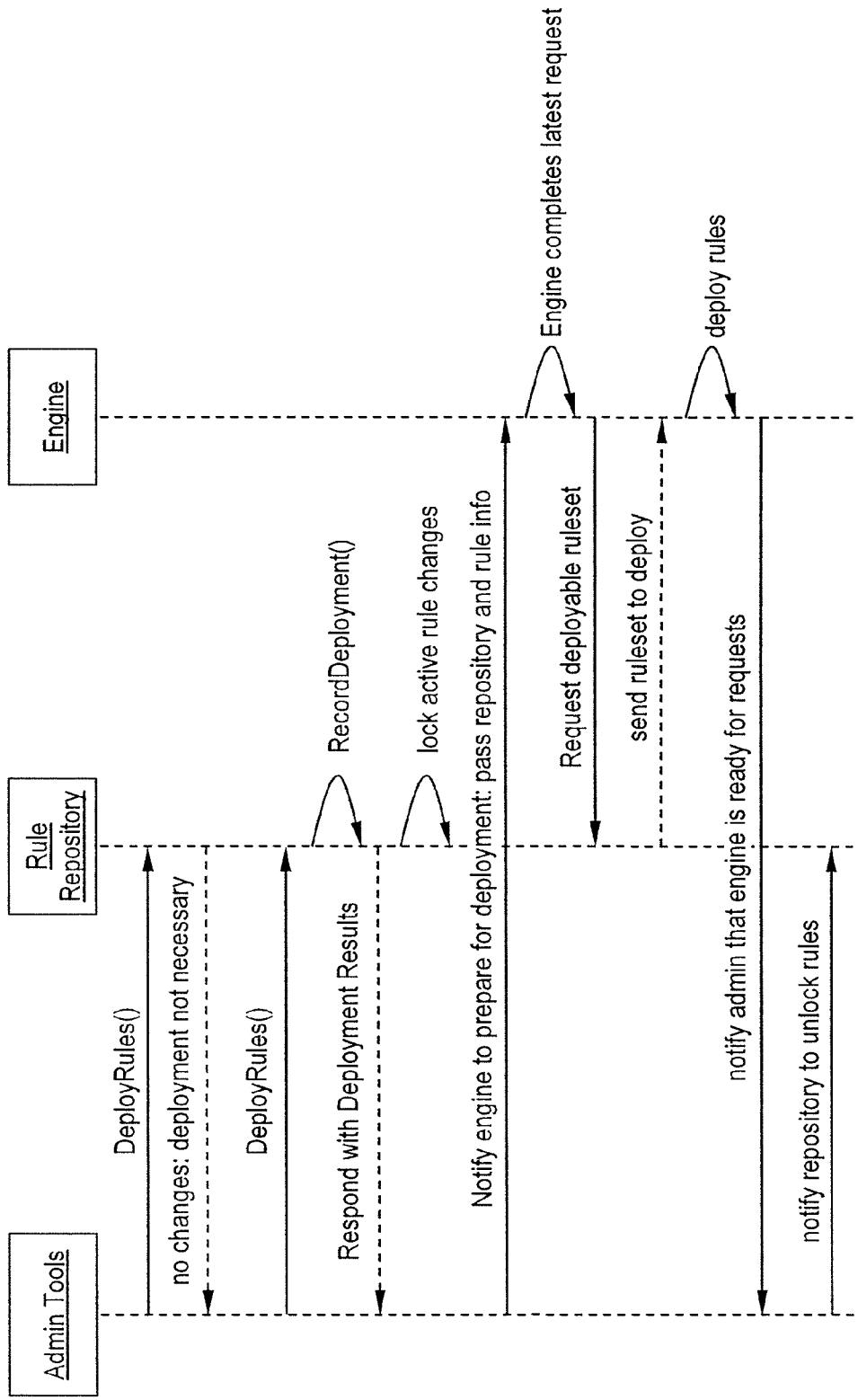

COMPLIANCE RULES ANALYTICS ENGINE

CROSS REFERENCE TO RELATED APPLICATION

This application is a continuation of now-pending application Ser. No. 11/253,273, filed Oct. 18, 2005, which claims the benefit of Provisional Application Ser. No. 60/654,667, filed Feb. 18, 2005, both of which are hereby incorporated by reference in their entirety.

REFERENCE TO A COMPUTER PROGRAM LISTING APPENDIX SUBMITTED ON A COMPACT DISC

Applicants hereby submit computer program listings on a compact disc, 2 copies (Copy 1 and Copy 2) of which are submitted herewith. Each copy of the CD contains a master folder entitled "Macgregor_Tabet_CD_Contents" having a size of 33 MB and having been created on Oct. 10, 2005. The master folder contains a folder entitled XIPWS, having a size of 33 MB and having been created on Oct. 10, 2005. The XIPWS folder contains the following folders: a "3$^{rd}$ party" folder having a size of 1.33 KB, an "App" folder having a size of 403 KB, and a "Common" folder having a size of 32.6 MB, each of the folders having been created on Oct. 10, 2005 and each of the folders and all of the files contained in those folders, and on the CD, being incorporated herein by reference in their entirety. A complete listing of all files contained on each copy of the CD, their date of creation, and the size of each of those files is attached as Appendix I.

BACKGROUND OF THE INVENTION

The present invention relates to rule-based systems, e.g., portfolio compliance rule-based systems. Portfolio compliance is a unique challenge because it requires maintenance of potentially millions of aggregations with fast impact analysis of any proposed transaction set. An aggregation is a combination of positions, e.g., positions owned or controlled by a single trader or group of traders, that one can use to ensure compliance with rules such as regulations. A position is the amount of a security either owned (which constitutes a long position) or borrowed (which constitutes a short position).

Because the mapping between proposed transaction sets and a set of affected aggregations is not explicit, a compliance architecture must support an efficient matching, calculation and identification of affected aggregations to provide fast impact analysis and explicit reporting. The mapping is not explicit because the aggregations and the proposed transaction sets are both dynamic, e.g., changing over time. Many of these aggregations are comprised of hundreds or thousands of data values across a variety of data structures and sources.

Investment activity in large firms involves tens of thousands of daily transactions affecting a variety of aggregations. The requirement for effective pre-trade compliance is to quickly identify the impact of each set of transactions without adding delays to the investment process.

Conventional systems have not achieved comprehensive real-time scalable portfolio compliance. Only a small percentage of the portfolio compliance rules (typically less than about 10%) are evaluated in real-time. The large majority of compliance rules are checked only in a post-trade (post-mortem) basis. Such post-mortem checking means that violations are only detected after the fact and millions of dollars are put at risk or wasted in preventable errors. The primary impediment to implementing preventive measures is that current solutions do not provide the performance level and scalability needed to evaluate the status of portfolio compliance as part of real-time investment processes. Moreover, the business challenge is getting worse since most organizations have to deal with increasing volumes. Industry trends towards separately managed accounts and increased market regulation will continue to raise the performance thresholds that compliance solutions need to clear before they can be practically integrated into real-time investment processes.

From a technology perspective, existing devices are based on non-scalable and mostly stateful designs. In addition, prior methods typically restrict their choice of technologies to a small set of programming models. Typically portfolio compliance systems are built on procedural language frameworks (like C++) combined with relational database management systems. These systems do not achieve, and thus a need remains for, practical real-time scalable portfolio compliance.

SUMMARY OF THE INVENTION

The present invention relates to rule-based systems and methods, e.g., rule-based systems and methods for achieving portfolio compliance. One embodiment of the invention provides a compliance rules analytics system including: a rule editor operative to receive rule-related data and to convert the rule-related data into intermediate format data; a rule translator in communication with the rule editor and operative to receive the intermediate format data and operative to translate the intermediate format data into executable format data; and a compliance analytics engine (CAE) in communication with the rule translator and operative to receive the executable format data and to perform a compliance evaluation based at least in part on the executable format data, the evaluation being performed using, at least in part, a RETE-based process.

In one embodiment, the CAE includes: compliance services operative to receive a check compliance message from a request queue; a rules engine in communication with the compliance services and operative to receive a do-inference message from the compliance services and to execute executable format rule-related data; and business objects in communication with the rules engine. The business objects include: a data sensor in communication with the rules engine and operative to receive a get static data request from the rules engine and to return static data to the rules.net engine; and an aggregate sensor in communication with the rules engine and operative to receive a get aggregation data request from the rules engine and to return aggregation data to the rules engine.

Another embodiment of the invention provides a method for performing a compliance evaluation. The method includes: receiving rule-related data for portfolio compliance rules; obtaining aggregation data from an online analytic processing component; and performing a portfolio compliance evaluation based at least in part on the rule-related data and the aggregation data, the evaluation being performed using, at least in part, a RETE-based process.

Yet another embodiment of the invention provides a compliance rules analytics system including: rule editor means for receiving rule-related data and converting the rule-related data into intermediate format data; rule translator (RT) means in communication with the rule editor means, the RT means for receiving the intermediate format data and for translating the intermediate format data into executable format data; and compliance analytics engine (CAE) means in communication with the RT means, the CAE means for receiving the executable format data and for performing a compliance evaluation based at least in part on the executable format data, the evaluation being performed using, at least in part, a RETE-based process.

BRIEF DESCRIPTION OF THE ILLUSTRATED EMBODIMENTS

Figure 1A:
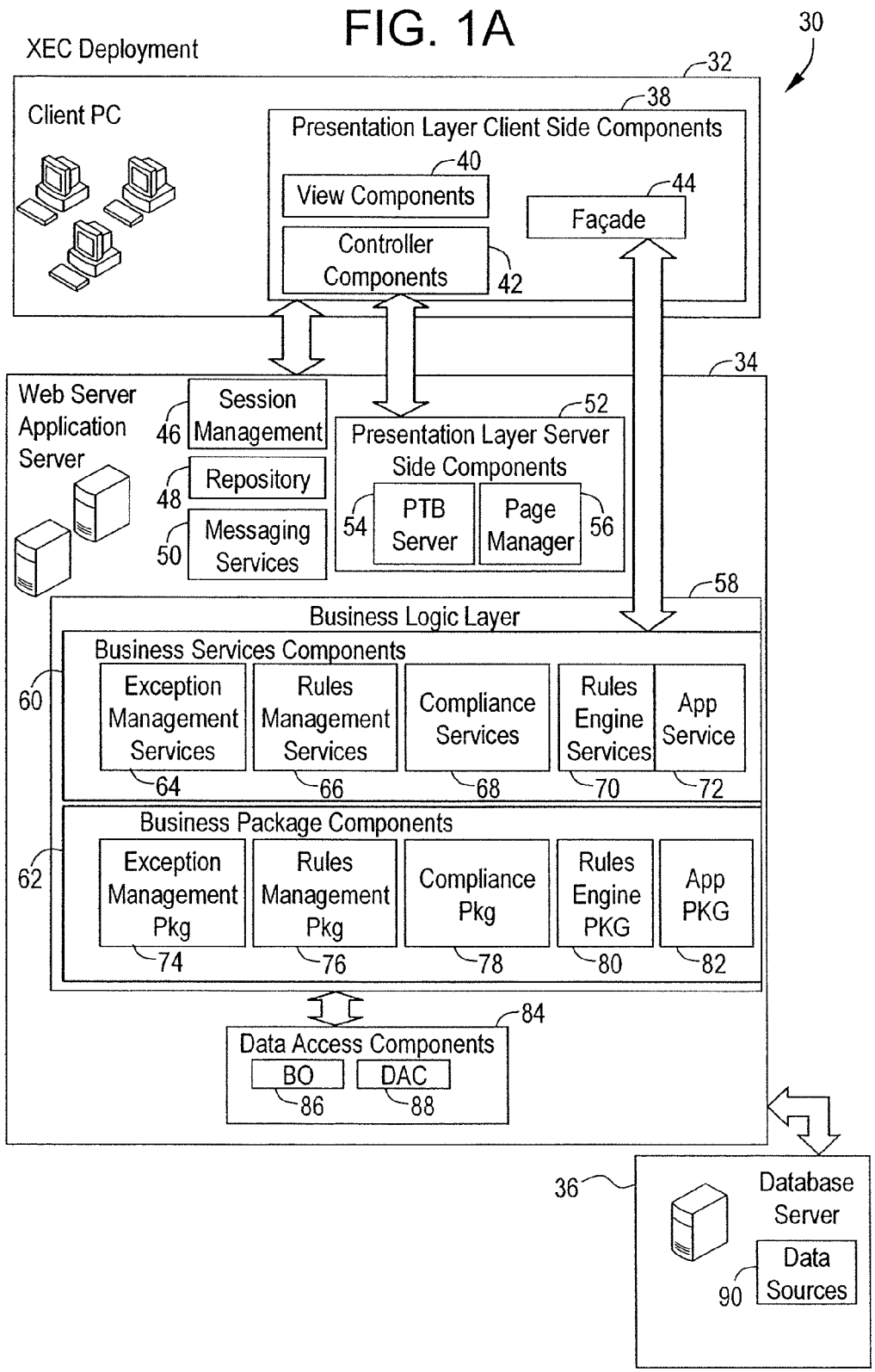
FIG. 1A is a deployment diagram for one embodiment of a system according to the invention.
Figure 2:
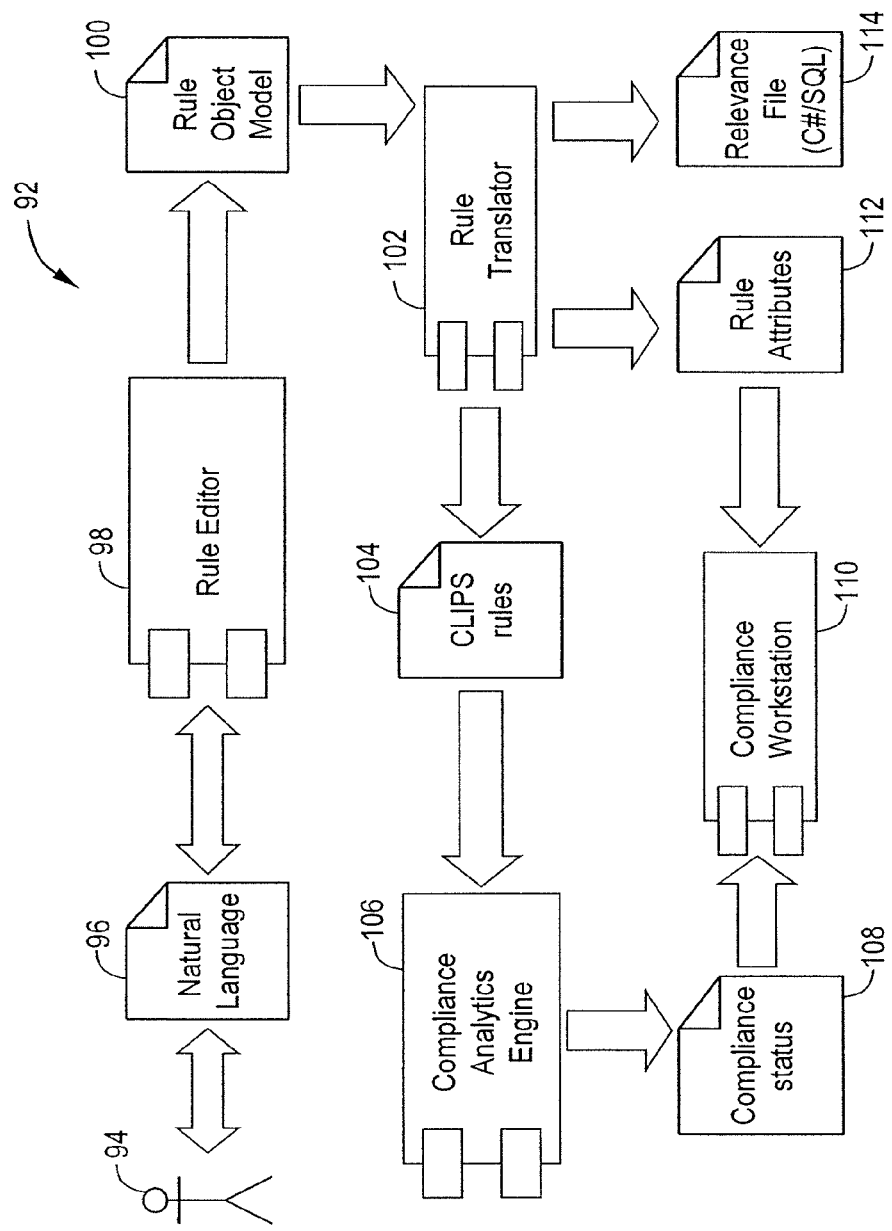

FIG. 2 is a high level diagram of major components of one embodiment of a system according to the invention. More specifically, FIG. 2 illustrates one embodiment of a cycle a rule goes through from the time it is authored by a user to its full implementation and deployment in the system. The components in FIG. 2 are part of the compliance services/package and rules engine services/package in the business logic layer of FIG. 1A.

Figure 3A:
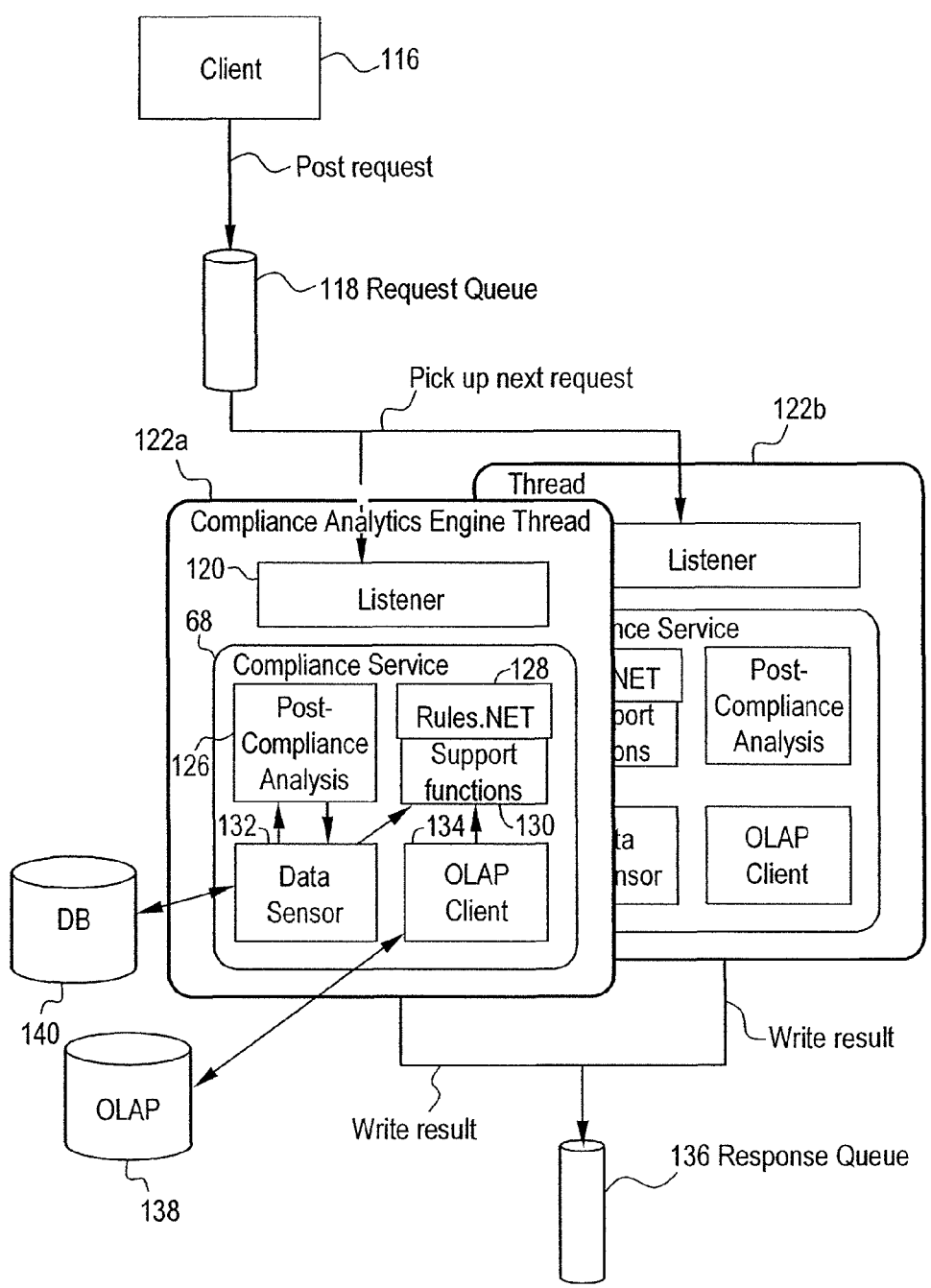

FIG. 3A is a high-level diagram of the execution (runtime) environment of the system of FIG. 2.

Figure 3B:
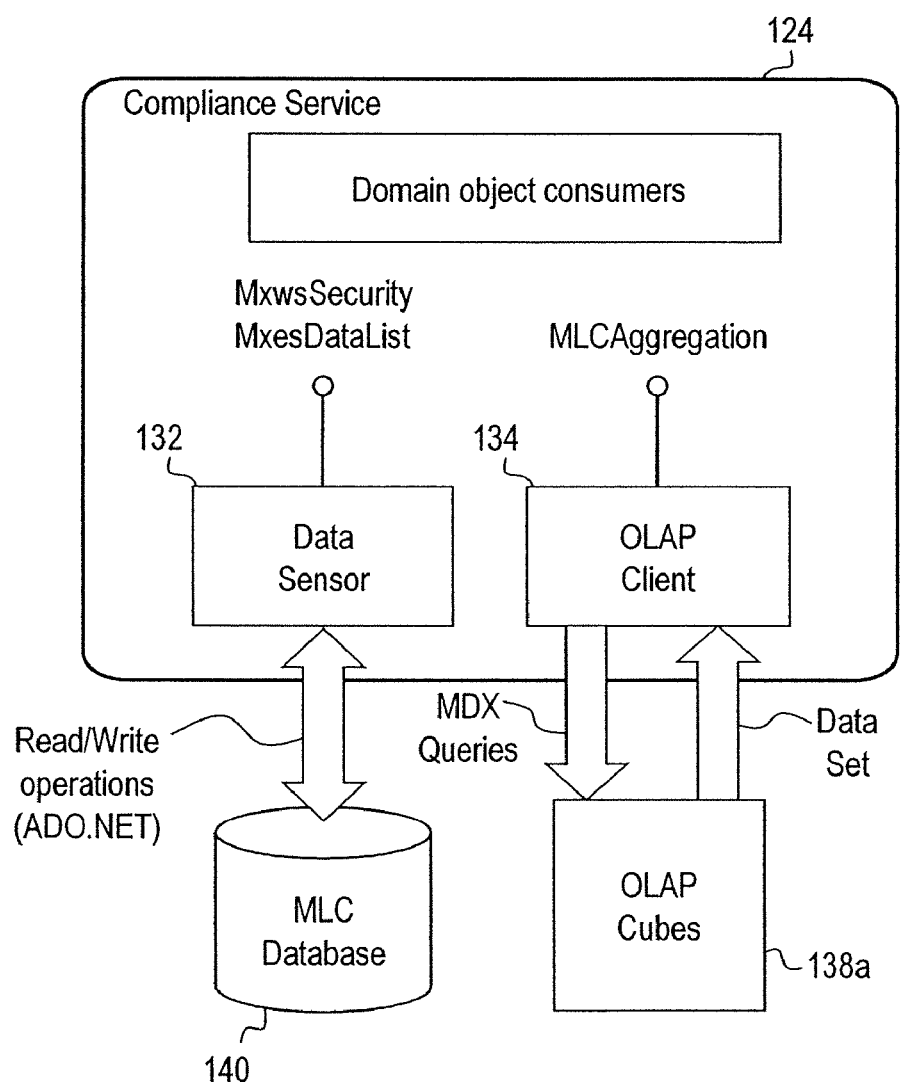

FIG. 3B is a data storage view of one embodiment of a portion of the system of FIGS. 1-3A.

Figure 4:
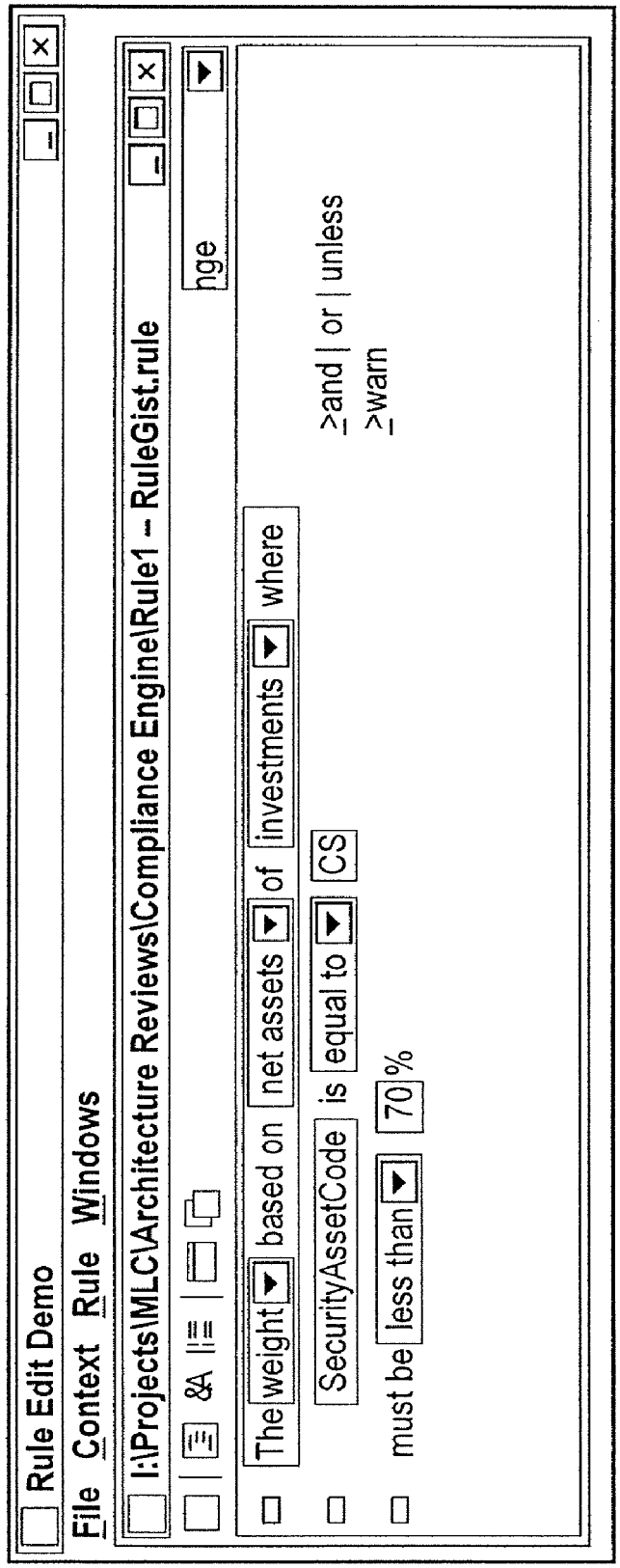

FIG. 4 is one embodiment of a screenshot of a graphical user interface (GUI) for the Rule Editor of FIG. 2.

Figure 5A:
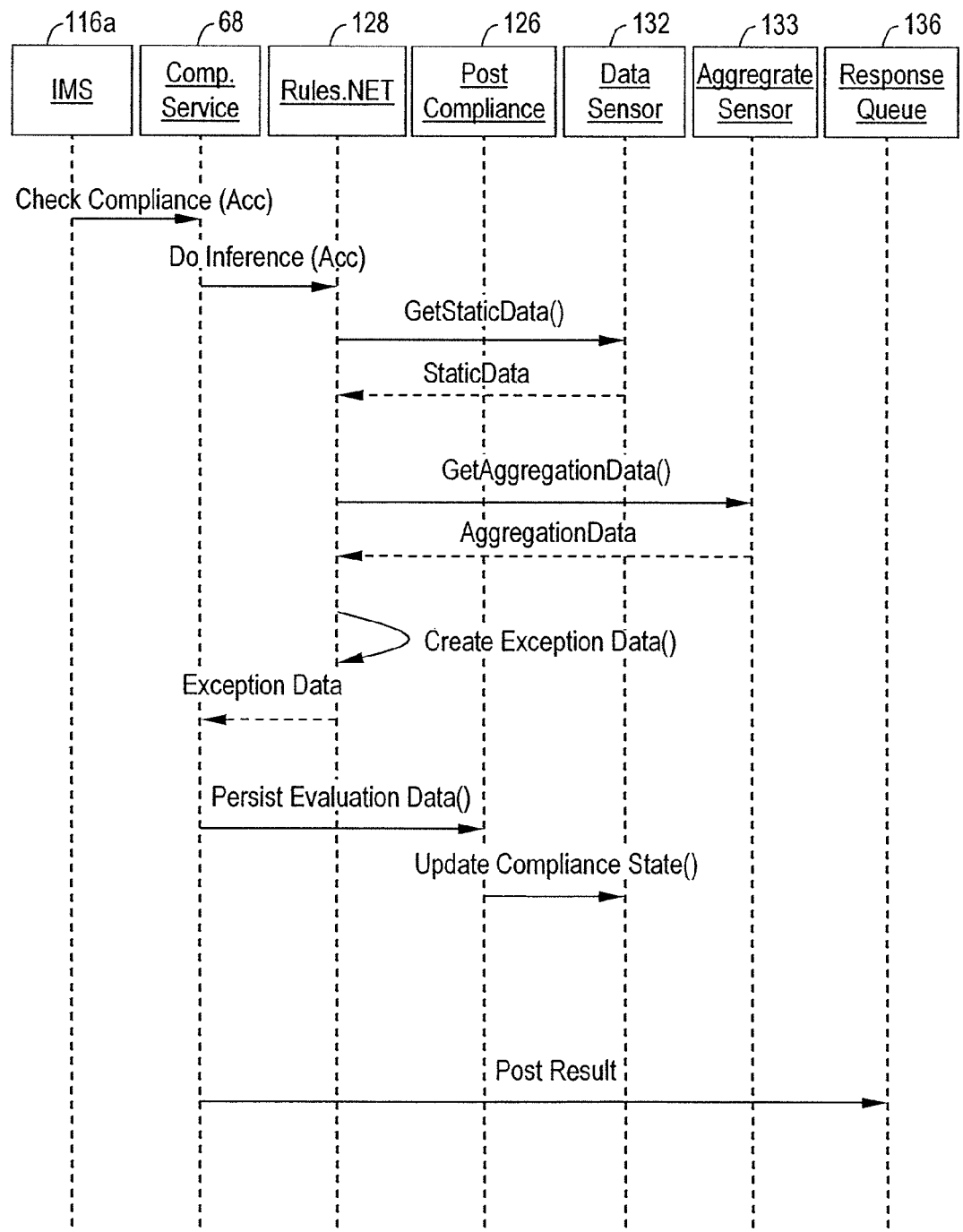

FIG. 5A is a sequence diagram for one embodiment of the operation of system of FIGS. 1-3B.

Figure 5B:
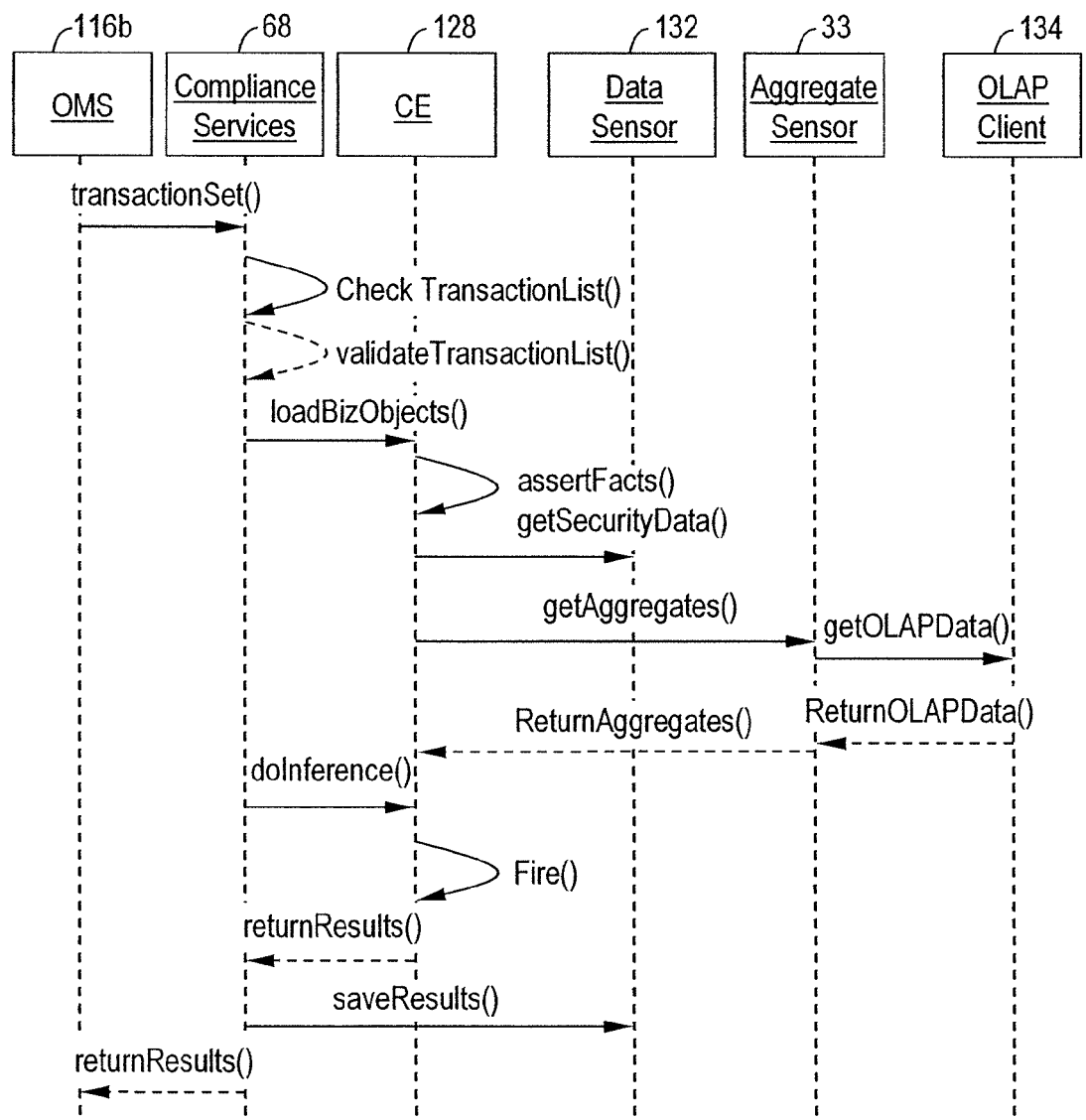

FIG. 5B is a sequence diagram for another embodiment of the operation of the system of FIGS. 1-3B.

Figure 6A:
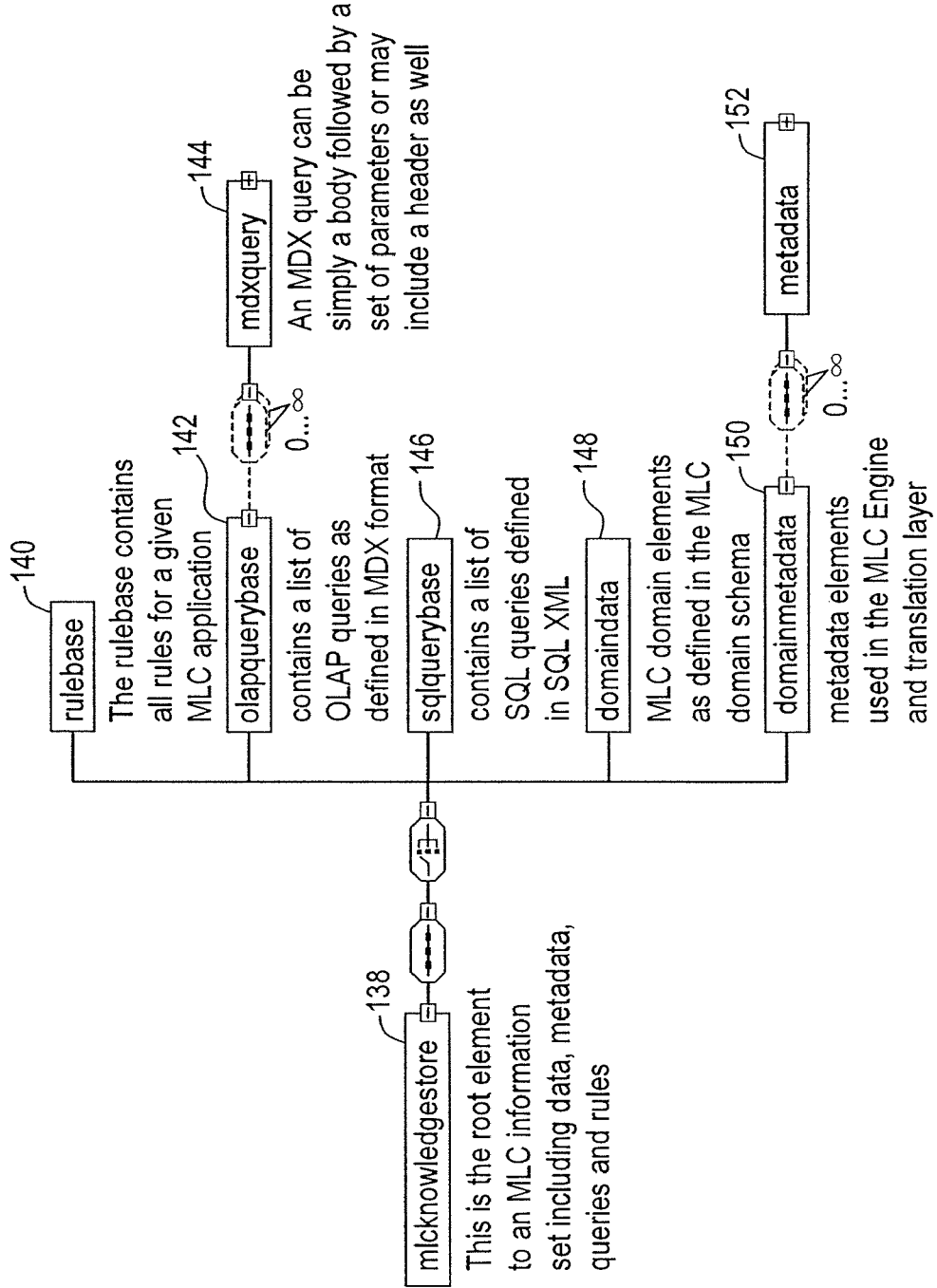
Figure 6B:
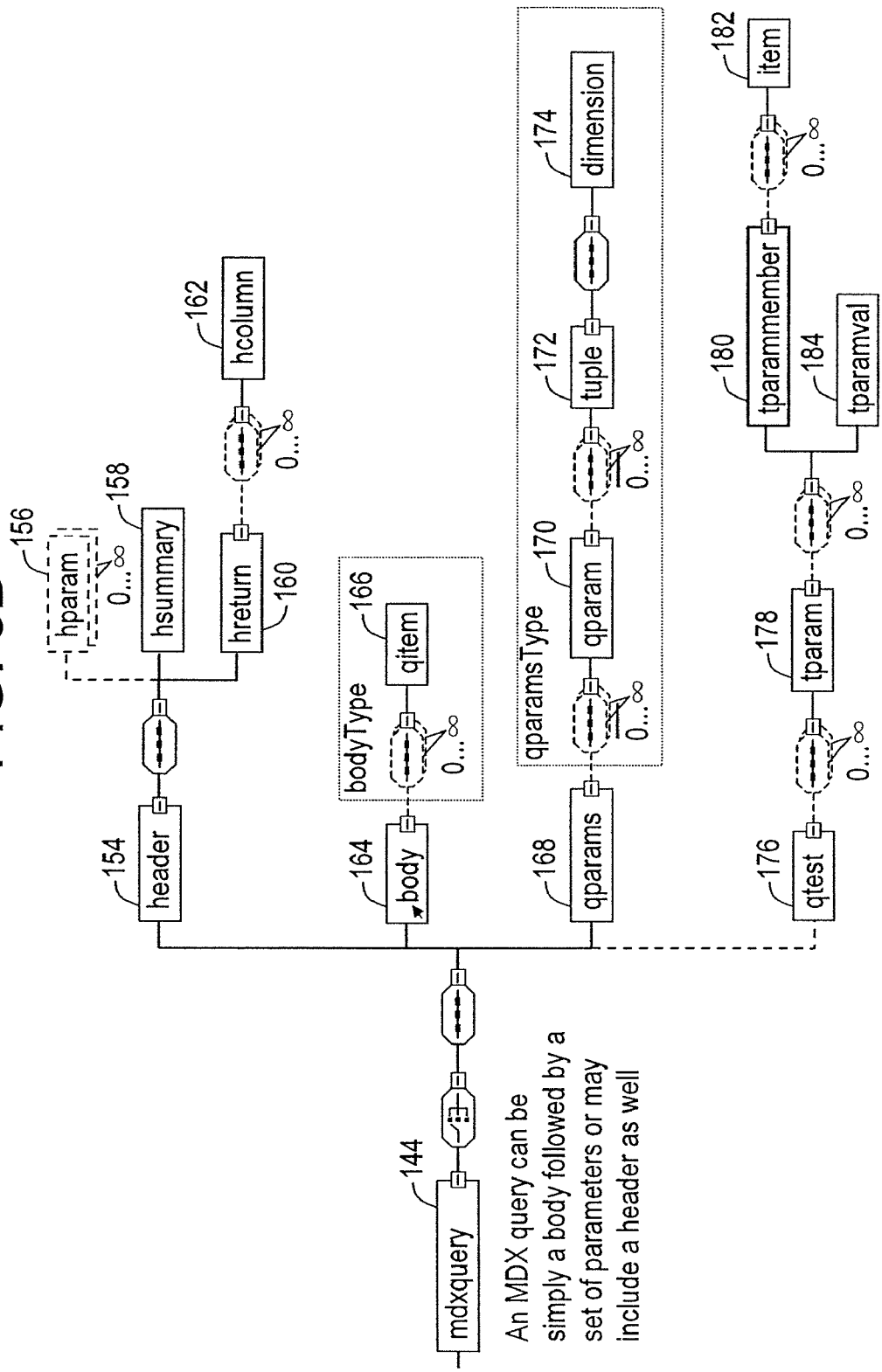

FIGS. 6A and 6B illustrate the structure of a Knowledge Management Framework (KMF) and a schema used to support online analytical processing (OLAP) integration. A Rule Object Model (ROM shown in FIG. 2) is an internal representation structure. KMF is directly related to the ROM, and to some aspects of the editor, and the persistence and deployment of the system. In other words, FIGS. 6A and 6B represent a database design for organizing data used by the system of FIGS. 1 and 2, the data being stored in database server 36.

Figure 1B:
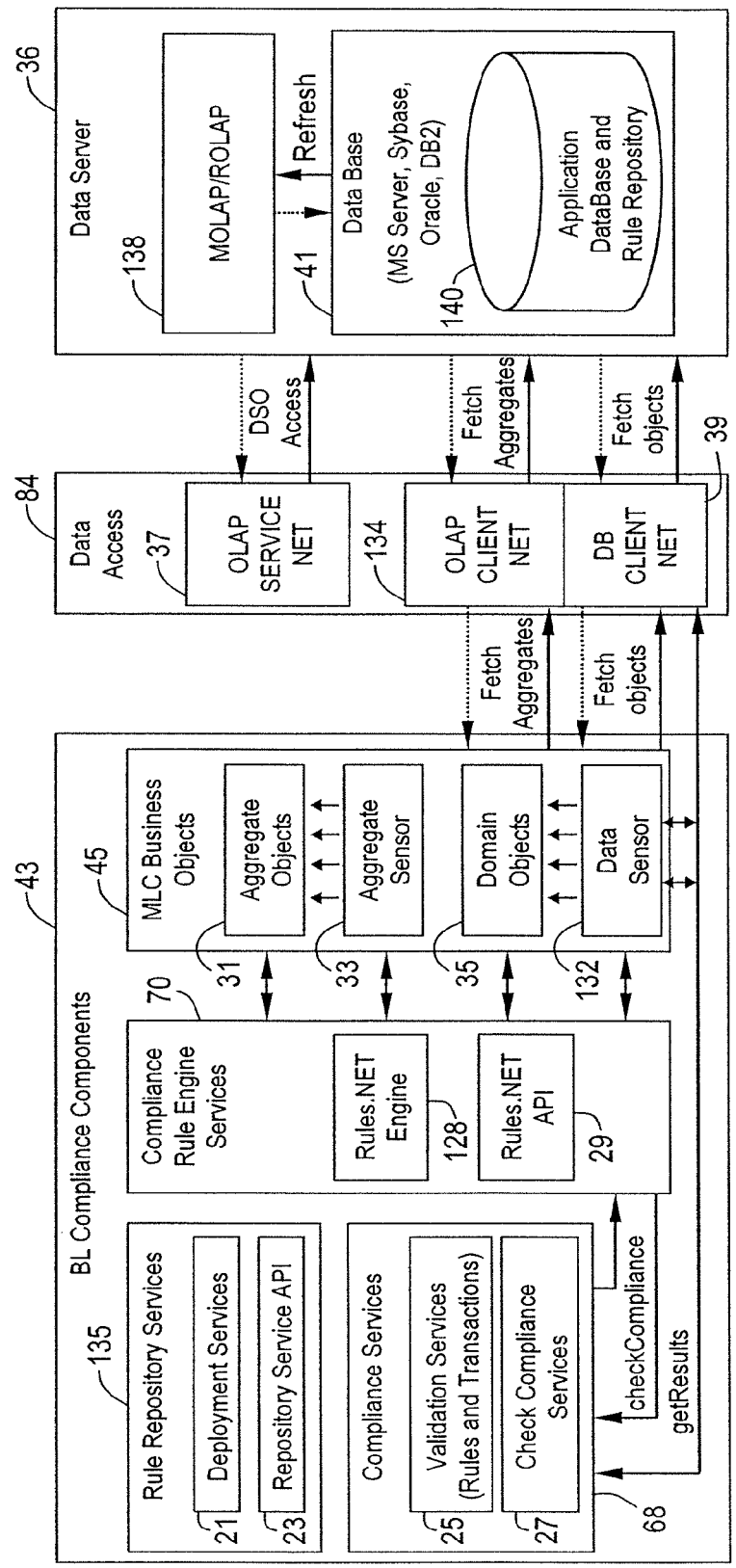
FIG. 1B illustrates additional details of portions of the system of FIG. 1A.

FIG. 7 is a sequence diagram for one embodiment of a rule deployment process for use with the system of FIGS. 1A and 1B.

Figure 8:
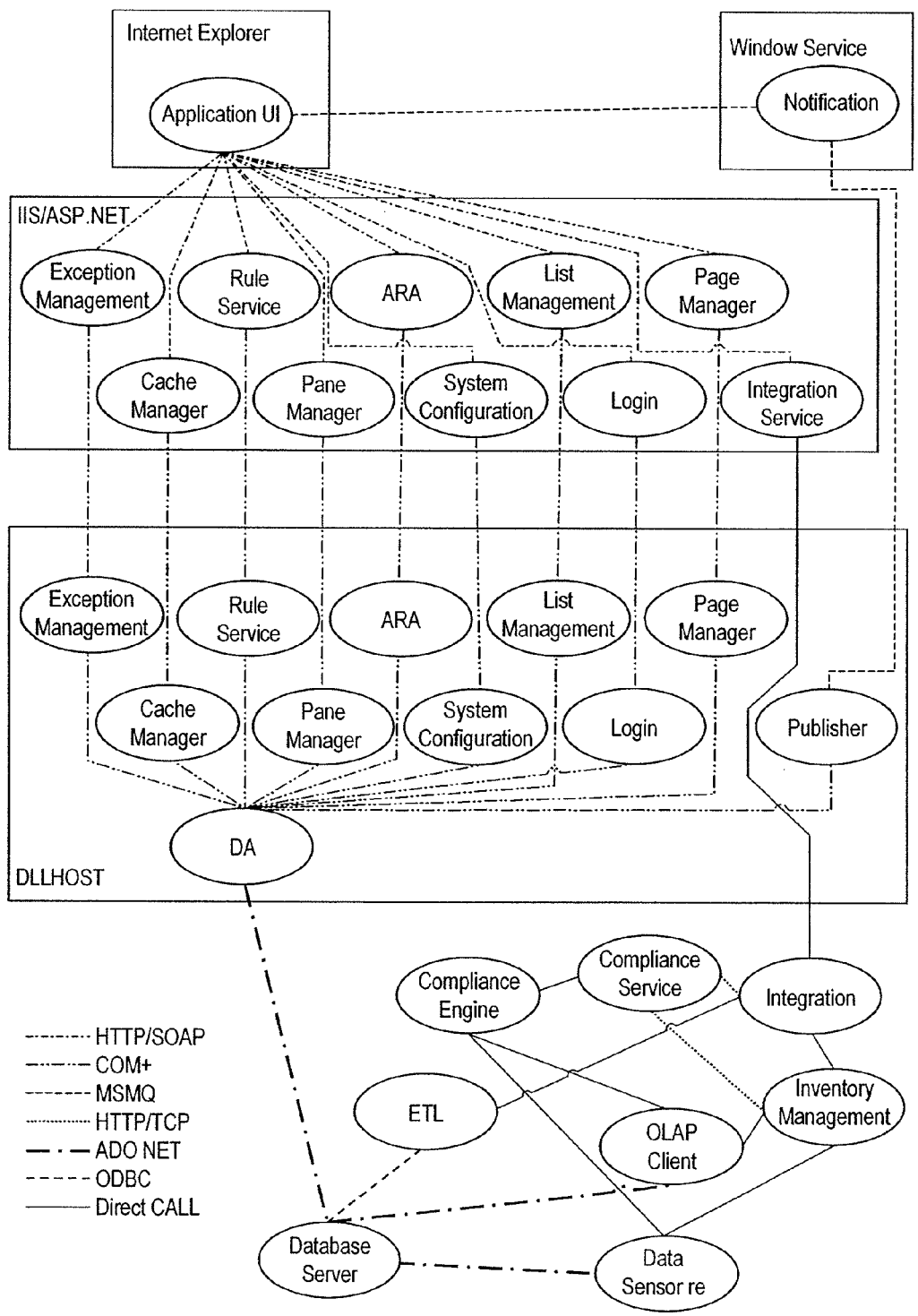

FIG. 8 illustrates communication protocols used between various components of the system illustrated in FIGS. 1A and 1B.

DETAILED DESCRIPTION OF THE INVENTION

The present invention relates to rule-based systems, e.g., such as rule-based systems for ensuring portfolio compliance. FIG. 1A is a deployment diagram for one embodiment of a system 30 according to the invention. With reference to FIG. 1A, the illustrated embodiment includes a web server application server 34 coupled to a database server 36 having data sources 90. The application server 34 has a business logic layer 58 that includes business services components 60 and business package components 62. The business services components include rules management services 66, compliance services 68, rules engine services 70, application service 72, and exception management services 64. Similarly, the business package components include a rules management package 76, a compliance package 78, a rules engine package 80, an application package 82, and an exception management package 74.

The application server 34 also has data access components 84 including business objects (BO) data access interface 86 and data access components (DAC) 88. The Data Access Components (DAC) are a set of components implementing data access functions in a data access layer (DAL). The DAL exposes the data stored in databases to the business logic layer (shown as element 58 in FIG. 1A). The Business Objects abstract domain objects (domain data) from specific database technologies (platforms). In addition, the application server 34 has a session management component 46, a repository component 48, and a messaging services component 50.

The application server 34 also has presentation layer server side components 52 including a Push to Browser (PTB) server 54 and a page manager 56. The application server 34 interfaces with a client PC 32. The client PC 32 has presentation layer client side components 38 including view components 40, controller components 42 and a façade 44. The façade 44 interfaces with the business logic layer 58 and the controller components 42 interface with the presentation layer server side components 52.

In other words, with reference to FIG. 1A, The Web Application Server 34 interacts with the database server 36 and its data sources 90. It also communicates with the client 32 and presentation layer components 38. The Web Application Server components include session management 46, a repository 48, messaging services 50, the presentation layer server side components 52, the business logic layer 58 and finally the data access components 84. The business logic layer has two sets of components: Business Services Components 60 and Business Package Components 62. The Business Logic Layer communicates directly with the client layer and interfaces with the Data Access Components. While the Business Services Components provide a web services interface to the business logic, Business Package components are the components that implement the actual business logic. The Business Package components have a one to one relationship to the business services provided by the system. Each package may access functionality implemented in other packages and reuse those implementations.

In operation, the presentation layer client side 38 components implement the user interface functionality such as viewing account data, rules, and compliance results. These components interface with presentation layer server-side 52 and allow the PTB Server 54 to push data from the server to the web client page and allow the page manager 56 to manage of page layouts. Session Management 46 and Messaging Services 50 are conventional application server infrastructure components. The Business logic layer 58 interfaces with the client side presentation layer. Its main function is to provide components implementing the application business logic. In one embodiment, the system aggregates Business Services 60 and Business Packages 62 in order to provide business logic for portfolio compliance clients. A business service is a standard web service and is coupled to a single business package. A business package implements specific functionality (application business logic such as check compliance, generate reports, and persist exception violations). In one embodiment, a business package is based on conventional .NET enterprise service technology available from Microsoft Corporation of Redmond Wash. Business logic layer interfaces with data access components 84 which encapsulate all data access logic. The Data Server component 36 is a conventional database server (MS SQL Server for example)

With reference to FIG. 1B, one embodiment of the component structure for the system of FIG. 1A includes business logic (BL) compliance components 43 in communication with data access components 84 (also shown in FIG. 1A). The data access components 84 are, in turn, in communication with data server 36 (also shown in FIG. 1A). The BL compliance components 43 include compliance services 68 in communication with compliance rule engine services 70, which are in communication with business objects 45. The component 84 (Data Access) provides an interface for accessing data storage and retrieving data to the compliance components 43 via BO data access interface 86 (FIG. 1A).

The compliance services 68 include validation services (rules and transactions) 25 and check compliance services 27. Validation services 25 checks a rule to confirm that the rule conforms to a particular grammar and check compliance services 27 confirms that a proposed trade or set of trades complies with a rule or set of rules. The compliance check generates a 'pass/fail' status where fail means that a rule is violated. Whether the compliance check generates a pass or a fail status, the system returns calculated values, if any, to show how proposed transaction violates a rule. In one embodiment the compliance rule engine services 70 include a rules.net engine 128 and a rules.net application programming interface (API) 29. .NET is a Microsoft operating system platform that incorporates applications.

The business objects 45 include aggregate objects 31, aggregate sensor 33, domain objects 35 and a data sensor 132. Compliance services 68 are in communication with the data sensor 132. The two components communicate internally using an interface (API), and exchange data from the domain model (e.g., securities, positions, account information) represented as C# objects.

The BL compliance components further include rule repository services 135. The repository services 135 include deployment services 21 and a repository service application programming interface (API) 23.

In one embodiment the data access components 84 include an online analytical processing (OLAP).service.net service 37 (primarily responsible for OLAP refresh) and one implementation of OLAP.service.net is based on the Microsoft Decision Support Object (DSO) package. OLAP is computer processing that enables a user to easily and selectively extract and view data from different points-of-view. For example, a user can request that data be analyzed to display a spreadsheet showing all of a company's suntan lotion products sold in Massachusetts in the month of August, compare revenue figures with those for the same products in October, and then see a comparison of other product sales in Massachusetts in the same time period. To facilitate this kind of analysis, OLAP data is stored in a multidimensional database.

MOLAP (multidimensional online analytical processing) is OLAP that indexes directly into a multidimensional database. In general, as noted above, an OLAP application treats data multidimensionally; the user is able to view different aspects or facets of data aggregates such as sales by time, geography, and product model. If the data is stored in a relational database, it can be viewed multidimensionally, but typically only by successively accessing and processing a table for each dimension or aspect of a data aggregate. MOLAP processes data that is already stored in a multidimensional array in which all possible combinations of data are reflected, each in a cell that can be accessed directly. For this reason, MOLAP is, for most uses, faster and more user-responsive than relational online analytical processing (ROLAP), the main alternative to MOLAP.

The data access components 84 further include an OLAP-.client.net service 134. This service accesses aggregate data from within the left-hand side (LHS) of a rule (i.e., the condition part of a rule). In other words, this service accesses data based on the expression contained in the LHS side of a rule. The following is an example of a rule using 2 aggregates in its LHS. This rule implements a money Markey fund compliance rule:

```
(defrule R2A7MDWAM90
   (Macgregor_XAT_Compliance_Component_EngineConnector
         (OBJECT ?connector)
   )
   (Macgregor_XAT_PersistenceLayer_MxwsModifiedAccount
(processStageID ?processStage)
         (userID ?userID)
         (accountID ?accountID)
         (OBJECT ?modAcc)
   )
   (Macgregor_XAT_PersistenceLayer_TypedViewClasses_V_MxwsAccountRow
         (accountID ?accountID)
         (accountClassCode "040101")
         (OBJECT ?ac)
   )
   (Macgregor_XAT_PersistenceLayer_MxwsDataListAccount
         (ruleCode "R2A7MDWAM90")
         (exclude FALSE)
         (listBasis 0)
         (OBJECT ?aclist)
   )
   ;; call isMember to test
   (test (call ?aclist isMember ?accountID) )
   (Macgregor_XAT_PersistenceLayer_Aggregation
(processStageID ?processStage)
         (sliceValue ?accountID)
         (measure ?accTotal)
         (key "10.3.0")
         (OBJECT ?accAggrTV)
   )
   (Macgregor_XAT_PersistenceLayer_Aggregation
(processStageID ?processStage)
         (sliceValue ?accountID)
         (measure ?accTotalm)
         (key "10.4.0")
         (OBJECT ?accAggrTVM)
   )
   (test (<  0.0 ?accTotal ) )
```

-continued

```
    (test
        (<
            90.0
            (/ ?accTotalm ?accTotal )
        )
    )
=>
    (create-exception2  ?connector "R2A7MDWAM90" "1.0" ?modAcc
?aclist "" "" "C" "Macgregor_XAT_PersistenceLayer_Aggregation"
?accAggrTVM)
)
```

In addition, the data access components 84 include a DB.client.net service 39. This component is a database client and provides data source connectivity and access.

The data server 36 includes a MOLAP/ROLAP component 138 and a database 41 that includes an application database and rule repository 140.

FIG. 8 illustrates communication protocols used between various components of the system illustrated in FIGS. 1A and 1B. Thus, one embodiment of the system uses a variety of protocols such as HTTP/SOAP, COM+, MSMQ, HTTP/TCP, ADO. NET, ODBC, and Direct CALLs depending on which components are communicating.

The OLAP.client.net service 134 generates objects that the system matches against specified properties for the left hand side of a rule. One example of an aggregate object includes the following information: measure (holds the value of the aggregate as returned by OLAP), key (represents the kinds of aggregate value, here 10.3.0 means account total market value), and slicevalue (here the system sliced the data based on the account ID, this is just an input to OLAP). The OBJECT variable holds a pointer to the aggregate so the system can use it in the rule where it is declared:

```
(Company_XAT_PersistenceLayer_Aggregation
    (sliceValue ?accountID)
    (measure ?accTotal)
    (key "10.3.0")
    (OBJECT ?accAggrTV)
)
```

The Business Objects layer deals with aggregate objects and with domain objects, A domain object is an object containing data of interest to the system—a domain object is an object from a domain model. A conventional domain object encapsulates business rules and logic. A Domain Model creates a web of interconnected objects, where each object represents some individual entity, the individual entity having meaning to the system. The individual entity can be as large as a corporation or as small as a single line on an order form. In the present invention, the rules are separate from the domain objects.

Using service rules, the Compliance Engine generates aggregate objects dynamically based on the rules needs. The conditions of each rule match on specific objects. Furthermore, one who creates a rule can assign compliance rules to specific accounts. The combination of this information allows a compliance engine according to the invention to create instantiations of aggregate objects at runtime as the rules fire for a given account (or accounts) Similarly, the system creates domain objects using the data sensor layer. Domain objects are created similarly to aggregate objects, based on rules conditions (referring to specific classes of data for given accounts). The engine uses the data sensor to issue a conventional query to the database and fetch that data. The object instances are then created from the returned data. This is not a standard command in C# Jess (C# is a programming language and Jess is a general purpose rule engine). The aggregate object and domain object messages contain object instance, data values according to the attributes of those objects and their types. Examples of such domain objects include securities, position data, and account details. An asset object has attributes such as an asset ID, a short name, an asset type code, an issuer ID, a primary exchange code, price currency code and votes per share. At runtime, given one or more accounts and their specific properties or constraints (for example a money market account), we only create object instances related to such a context. This allows the system to load only necessary data objects and optimize memory usage, One could imagine generating SQL code to query the data sources before running rules, but such an approach is not efficient.

Thus, one embodiment of the BL compliance components include:

Rules.NET: A .NET platform forward chaining rule engine;

a compliance engine Gateway (Compliance Services): a high level layer allowing the compliance engine to interact with external systems;

Data Sensor DB.Client.NET and Data Sensor: allow the engine to communicate with data sources;

Aggregate Sensor and OLAP.Client.NET defining an OLAP interface allowing the engine to integrate seamlessly with analytics systems. An analytics system is a software system embedding an analytics engine (an OLAP engine in one embodiment) or simply an OLAP engine with a wrapper interface to communicate with external systems. An IBM DB2 OLAP Server available from IBM corporation of Armonk, N.Y. and an Oracle 9i OLAP Analytics Workspace (AW) available from Oracle Corporation of Redwood Shores, Calif. are two examples of other analytic engines that a system according to the invention can use. One embodiment of the Compliance Rules Engine integrates seamlessly with OLAP using an architectural design that allows the system to expose OLAP functionality in an Object Factory (an API) and that allows rules to use OLAP results (data objects). Instead of integrating directly with the analytics system, one embodiment of the invention uses an object model that defines OLAP objects as part of its model. This embodiment encapsulates calls and interactions with OLAP systems in a 'standards' way and allows its internal components (particularly the engine in this case) to use these objects inside rules as if the objects are domain objects themselves. This embodiment of the invention translates method calls into calls to the OLAP system in use. Objects produced by the OLAP object factory appear in our service rules as any other objects. This design provides flexible integration and ease of maintenance; and A Rule Repository offering a storage and a translation mechanism for rules along with a query and deployment facility. The translation mechanism uses XSLT technologies to translate XML code into internal code representation. Using XSLT is conventional, and there are many conventional XSLT tools. For example, one embodiment of the invention uses MSXML from Microsoft Corporation of Redmond, Wash. C# also provides a similar tool as a library (dll), also provided by Microsoft Corporation. A rule cycle flow is shown in FIG. 2 and is described in the text associated with FIG. 2.

A core element of the compliance engine is Rules.NET, its rule engine. Rules.NET is a forward chaining rule engine using, in one embodiment, a pattern matching data driven algorithm called RETE. This algorithm defines a network of logical patterns (rule conditions) and allows for the reuse of common patterns between rules, enabling fast evaluation of conditions and activation of rules.

System Interfaces

The Rules.NET library 29 is an API allowing various levels of access to the Rules.NET engine execution environment and object model. The library (a DLL) allows a Rules.NET user to observe/manipulate the operation of the rules engine. As an example, a user can see the rules being selected for execution, new facts that have been created, data that has been updated, and the number of rules that have been fired. The Library (a dynamic link library or DLL) can be used by various components to build services. A dynamic link library is a library which is linked to application programs when they are loaded or run rather than as the final phase of compilation.

The Compliance Engine Gateway (Compliance Services) 68 interface is a bridge allowing the integration and interaction between the compliance engine 70 (component 70 can be referred to as a compliance engine or as compliance rules engine services—one uses the term services in the context of APIs and interfaces and one uses the term engine in the context of components) and external components and services, such as an order management system (OMS). It is the entry point for compliance checking on a proposed set of orders or a list of transactions. The gateway provides low-level validation such as data type checking, integrity check, and other validation tests such as checking if the input transaction set exists already. The gateway is also used to retrieve the results from the underlying engine and stores them in the database using the data access layer interface.

DB.CLIENT.NET 39 is an API used for data access by components of the system. The engine's data sensor uses this interface to retrieve security data for example, and other domain model objects, as needed.

OLAP.CLIENT.NET 134 defines the interface to access aggregate data in the OLAP server using the engine's aggregate factory. The retrieved aggregate data is also transformed into objects using this interface and asserted as facts into the engine's working memory.

OLAP.SERVICE.NET 37 is primarily responsible for OLAP refresh. This component defines an API facilitating its configuration and the management of multiple OLAP cubes installations. It also provides a method to set a refresh interval as a default or per declared cube. A cube update service can be turned off, for example in the case of overnight cycles. The overnight cycle is a process that takes place at a scheduled time after the end of day (after the market closes). It includes any processing on carry over orders, changes to data, generation of reports on all activity that happened that day, and in some cases, tests all rules against the data and generates reports on compliance checks at that point as well.

Rules.NET Engine 128

Rules.NET is a J# port of the Java-based Jess rule engine. J# is a Microsoft-supported language for .NET. J# is Microsoft's implementation of the Java programming language. As noted above, .NET is a Microsoft operating system platform that incorporates applications. Rules.NET adds an extended API to allow for an easy integration with the platform. one can practice this invention using any "Production Rules Engine" that supports .NET platform or Java platform.

The following table describes the component information:

TABLE 1

| Rules.NET Service Component Information | |
|---|---|
| Namespace | Platform.BL.Engine |
| Type | IEngine |
| Responsibilities | Wrap Jess 6.0 |
| | Provide a rule engine API in C# |
| | Reasoning |
| | Port Java Jess to .NET J# |
| | Unit and regression tests |
| Collaborators | Sandia Jess 6.0 |
| Notes | |
| Issues | |
| Assembly name | Rules.NET |

Compliance Engine (CE) Gateway Service 68

In one embodiment, the CE gateway service 68 is the primary check compliance interface for all other components of the platform. Given a set of orders, the compliance service, via its interface with the rule engine, captures a set of violations generated by rule firings in the engine (if there are any), and returns them to the requester (for example an order management system) In one embodiment the order management system interfaces with the system via the façade 44 shown in FIG. 1A.

The CE gateway uses Rules.NET engine deployment descriptors (XML files) combined with a configuration model to load rulebases as well as any required data and metadata. A rulebase is a set or a group of rules. For example, one can create a rulebase made of rules specifically dealing with money market funds. FIG. 7 illustrates one embodiment of a deployment process flow. A deployment descriptor is an XML file describing the rulebase location and name (the rulebase to be deployed).

With reference to FIG. 7. a deployment process begins with an administration tools component (also referred to as the rule management component) sending a deploy rules message to the rule repository component (RRC). If the RRC determines that the rules have not changed, the RRC sends the administration tools component (ATC) a message indicating that the rules have not changed and deployment is not necessary. If deployment is necessary the RRC records deployment and forwards deployment results to the ATC. The RRC then locks active rule changes. The ATC in turn notifies the engine to prepare for deployment and passes repository and rule information to the engine. The engine completes the latest request from the ATC and sends a request to the RRC for a deployable ruleset. The RRC sends a ruleset for deployment. The engine deploys the rules and notifies the ATC that the engine is ready for requests. The ATC then notifies the RRC to unlock the rules.

The following table describes the CE Gateway Service component information:

TABLE 2

MLC Service Component Information

| | |
|---|---|
| Namespace | Platform.Compliance |
| Type | Compliance |
| Responsibilities | Initialize other components, such as the DataSensor |
| | Load deployment descriptor information |
| | Load rules (including service rules) and initial facts |
| | Request data using service rules |
| | Reasoning |
| | Return results declaratively by embedding them in the VBOS object, the root object in one embodiment of a domain object model for use with the invention. |
| | Provide an interface for external world |
| Collaborators | Rules.NET, DB.CLIENT.NET, OLAP.CLIENT.NET |
| Notes | |
| Issues | |
| Assembly name | Compliance |

DB.CLIENT.NET Service

This component is a database client, using an object linking and embedding database (OLEDB) provider. In other words, one embodiment of the invention uses a database management system, such as Microsoft SQL server available from Microsoft Corporation of Redmond Wash., that supports standard query language (SQL). The database client provides concrete support for data source connectivity and access. Its API is generic and facilitates data access for certain components.

The following table describes the component information:

TABLE 3

DB Client.NET Component details

| | |
|---|---|
| Namespace | Platform.BO.DB.Client |
| Type | DB.Client |
| Responsibilities | Define API to get primitives and connect to a specific data store |
| | Provide concrete support for API |
| | Load deployment descriptor |
| Collaborators | OLEDB provider |
| Notes | |
| Issues | |
| Assembly name | DB.Client |

OLAP.CLIENT.NET Service 134

The system uses OLAP.CLIENT.NET to access aggregate data from within the left-hand side of a rule (the condition part of a rule). A typical example of an aggregate object is one that stores the total market value for a given account. Here is an example of this aggregate object used in the condition of a compliance rule:

```
(Macgregor_XAT_PersistenceLayer_Aggregation
    (sliceValue ?accountID)
    (measure ?accTotal)
    (key "10.3.0")
    (OBJECT ?accAggrTV)
)
```

The variable ?accTotal hold the MarketValue for a given account with the account ID matching the value stored in the variable ?accountID. The key "10.3.0" represents a market value by account.

Here is an example of rule leading to the aggregate mentioned:

```
(defrule R1940ACT5b1DMax5TAV_qry_accmv
        (Macgregor_XAT_Compliance_Component_EngineConnector
            (OBJECT ?connector)
        )
        (Macgregor_XAT_PersistenceLayer_MxwsModifiedAccount
(processStageID ?processStage)
            (userID ?userID)
            (accountID ?accountID)
            (OBJECT ?modAcc)
    )
(Macgregor_XAT_PersistenceLayer_TypedViewClasses_V_MxwsAccountRow
        (accountID ?accountID)
        (accountClasscode "040101" | "0401")
        (OBJECT ?ac)
    )
    ;; get the DataList for the account rule association
    (Macgregor_XAT_PersistenceLayer_MxwsDataListAccount
            (ruleCode "R1940ACT5b1DMax5TAV")
            (exclude FALSE)
            (listBasis 0)
            (OBJECT ?aclist)
    )
    ;; call isMember to test
    (test (call ?aclist isMember ?accountID) )
    (not
        (Macgregor_XAT_PersistenceLayer_Aggregation
(processStageID ?processStage)
            (key "10.3.0")
            (sliceValue ?accountID)
        )
    )
=>
    (create-aggregate2 "regular" "" ?modAcc "10.3.0" false
0)
    (printout t "create-aggregate2"   crlf)
```

The aggregate is created only if it is not already available to the engine (see the not statement in the LHS of the rule).

This OLAP.CLIENT.NET service component 134 is an OLAP client, used to execute OLAP queries. The component is auto generated from the domain object model using XSL transformations. The OLAP.CLIENT.NET service provides an API allowing the auto-generation of methods for aggregates based on templates. As described more fully below, one can use an OLAP multi-dimensional expression (MDX) query markup to query OLAP databases. Furthermore, one can base the MDX queries on templates.

The following table describes the component information:

TABLE 4

OLAP Client.NET Component details

| | |
|---|---|
| Namespace | Platform.BO.OLAP.Client |
| Type | OLAP.Client |
| Responsibilities | Define API to get aggregates from OLAP service |
| | Used by AggregateFactory |
| | Define API to auto-generate methods for new aggregates |
| Collaborators | Microsoft ® ADOMD or different multidimensional data provider |
| Notes | |
| Issues | |
| Assembly name | OLAP.Client |

With reference to FIGS. 1B and 3B, The OLAP client 134 sends multi-dimensional expression queries to OLAP cubes 138a and receives datasets in response. Similarly, data sensor 132 performs read/write operations on the database 140.

With reference to FIG. 2, major software components of one embodiment of a system 92 according to the invention include a business rules definition component, e.g., a natural language grammar 96 and a Rule Editor 98. In operation, organizations can define complex business rules using application specific languages and tools (e.g., a natural language compliance grammar 96 and a Rule Editor 98) best suited to the task. Appendix II provides one embodiment of a rule grammar specification for a structured standard grammar language close to Backus Naur form (BNF) standard syntax. Using this specification, a person of ordinary skill in the art can create a rule editor and a natural language grammar that support the rule expressions provided in the compliance engine of the present invention.

FIG. 4 is one embodiment of a screenshot of a graphical user interface (GUI) for the rule editor 98 of FIG. 2. In the illustrated example, the user has specified via a set of inputs, e.g., drop-down menus and input fields, the following rule: "The weight based on Net Assets of investments where SecurityAssetCode is equal to CS must be less than 70%." In the case of enterprise portfolio compliance, one can use the rule editor 98 to define organization-specific and regulatory investment portfolio compliance rules.

Returning to FIG. 2, the rule editor converts the business rules into a machine-readable application and technology independent format (e.g., Rule Object Model format 100). The intermediate representation/format allows other applications to share and reuse a defined business rule, and for system developers to deploy the rules on alternative execution environments. A Rule Translator (RT) 102 receives the intermediate representation/format of the business rules and translates the business rules from the application and technology neutral format into an equivalent format suitable for high-performance execution in a specific runtime environment (i.e., in the Compliance Analytics Engine proper 106). In other words, one of the RT's outputs is an equivalent format (e.g., a C Language Integrated Production System, or CLIPS, rules format) of the compliance rules. The Compliance Analytics Engine (CA engine) 106 receives the CLIPS Rules as an input. CLIPS is a language for developing expert systems, with support for forward chaining rule-based, object-oriented and procedural programming.

In addition, in the illustrated embodiment the RT 102 extracts and persists the Rule Attributes properties 112 of the rule so that the rest of the system can directly access that information. In other words, the RT outputs Rule Attributes (RA) 112. The RA interface exposes a set of static basic properties of each rule that user interface (UI) applications require for display purposes. These properties can include a complete list of domain attributes referenced by the rule in question and information on how to navigate the attributes. The Security Asset Code from the security business object or the safe harbor date on the Account business object represent two examples of domain attributes referenced in regulatory rules (U.S. regulations as an example). There are other attributes regarding account properties (e.g., taxable or not-taxable and national or state).

The RT also generates a Relevance Filter (RF) function 114 for each translated rule. The RF 114 is an executable function unique for each rule. In one embodiment, in the portfolio compliance context, the RF receives as input a set of identifiers for securities and determines which of the securities, if any, contribute to the possible failure of that rule. A relevance filter is a function tightly coupled to the rule and in one embodiment is written as C# standard query language (SQL) code. One adds these filters to support post-compliance functionality. Here is an example of such code:

The properties to filter on are country and effective duration:

```
SELECT ids.SecurityID
FROM dbo.fn__SplitSecurityIDs(@spSecurityListID) ids
WHERE ids.SecurityID IN
(
    SELECT sec.AssetID
    FROM v__MxwsSecurity sec
    WHERE (((((CountryCode='CAN') or (EffectiveDuration<2))
    and (CountryCode='US'))
)
    or ((Sector<>'Tech'))
)
```

Once the CA engine 106 receives the CLIPS rules, the CA engine evaluates and records the status of portfolio compliance with respect to the assigned rules in near-real time. In other words, an output of the CA engine 106 is compliance status 108. A compliance workstation 110 accesses the rule attributes 112 and the compliance status information 108 to perform in-depth analysis and reporting.

With reference to FIG. 3A, a high-level diagram of one embodiment of the compliance analytics engine execution (runtime) environment shows a client 116 posting a request to a request queue 118. A listener component 120 picks up the next request in the queue. The specific request is associated with a compliance analytics engine thread 122a. A thread includes placeholder information associated with a single use of a program that can handle multiple concurrent users. From a program interface perspective, a thread is the information needed to serve one individual user or a particular service request. If multiple users are using the program or concurrent requests from other programs occur, a thread is created and maintained for each of them, e.g., a plurality of threads 122a, 122b are created.

With reference to FIGS. 1B, 3A and 5A, one embodiment of a compliance service 68 receives, e.g., from an inventory management service (IMS) 116a, via the request queue 118 and listener 120, a check compliance request associated with thread 122a. The compliance service passes a do-inference request to a rules.net component 128. The rules.net component 128 sends a get-static-data request to the data sensor 132. In response, the data sensor 132 returns static data to the rules.net component 128. The rules.net component 128 also sends a get-aggregation-data request to the aggregate sensor 33. In response, the aggregate sensor 33 returns aggregation data to the rules.net component 128.

The DoInference( ) call in 5a is a call for the engine to fire rules. The rules.net component 128 creates exception data, e.g., data regarding aspects of a portfolio and/or a set of trades that do not comply with deployed rules. The rules.net component 128 passes the exception data back to the compliance service 68, which in turn passes a persist-evaluation-data request to a post compliance component 126. The post compliance component 126 passes an update-compliance-state request to the data sensor 132 and the compliance service 68 passes a post-result request to the response queue 136.

With reference to FIG. 5B, another embodiment of the operation of the system of FIGS. 1A-3B includes the compliance services 68 receiving a transaction set from an order management system (OMS) 116b. The compliance services 68 perform a check-transaction-list function and a validate-transaction-list function. The compliance services 68 then send a load-Business-Objects request to the compliance engine (CE) 128, e.g., the rules.net engine. The CE performs an assert-facts function, sends a get-security-data request to the data sensor 132, and a get-aggregates request to the aggregate sensor 33. In response, the aggregate sensor passes a get-OLAP-data request to the OLAP client 134, which sends a return-OLAP-data message in response. The aggregate sensor 33 in turn sends a return-aggregates message to the CE 128.

When the CE 128 receives a do-inference request from the compliance services 68, the CE executes a fire function and returns results to the compliance services 68. The compliance services 68 send a save-results request to the data sensor 132 and send a return-results message to the OMS 116b.

With reference to FIGS. 1A and 2, one embodiment of a system 30 according to the invention includes Service Rules and a Knowledge Management Framework. The Rule Translator (element 102 of FIG. 2) generates the Service Rules. Service Rules provide a fast and flexible mechanism for accessing data elements needed for rule evaluation. The Knowledge Maintenance Framework (KMF) combines traditional object oriented and relational programming models with declarative rules and online analytical processing (OLAP) programming models into a common development platform.

Service Rules

A rule is a kind of instruction or command that applies in certain situations. For the purposes of this document, one embodiment of a rule has a left-hand side (LHS), i.e., a predicate or premise, and a right-hand side (RHS), i.e., an action or conclusion. One can imagine a rule without a LHS (no conditions), which one could interpret to be a fact, or without a RHS (no action), which one could interpret to be a query. The Service Rules provide a meta-evaluation level to efficiently optimize the calls to OLAP from the left-hand-side (condition part) of each compliance rule that is a candidate to be evaluated. In conventional OLAP usage, a procedural integration component would be built and used to access data in OLAP. Such an approach would require many calls and overhead. According to one embodiment of the invention, a user of the system can declare that a rule needs certain types of aggregates. When the rule matches on specific account information for a given rule, it will then generate an instance of the aggregate object, and use the parameters of the instantiation to call OLAP. OLAP will then return the results, for example a measure of the total market value for a given account. The system reuses such result in compliance rules to then check compliance status (for example a rule checking that a mutual fund market value for a given industry must be under 5% of the total of the account). The use of service rules (evaluated first before the compliance rules) filters unneeded data and information.

Metadata objects are objects used to define other objects. By creating metadata objects to represent aggregate instances and using them declaratively from within the left-hand-side of the rules, Service Rules provide a bridge between the analytics system (e.g., an OLAP system) and the rules-inferencing mechanism. An aggregate object, which is a metadata object, is used in the condition (LHS part) of a rule. The statement is declarative and not procedural where one would have to call a routine to communicate with OLAP.

One embodiment of the Service Rules bridge integrates the results of the analytics (OLAP processing) directly into the inferencing mechanism (i.e., the Rules Engine 128 in FIG. 1A). The engine not only processes domain data, but it also matches on the declaratively defined aggregations (specified in services rules, not executed in procedural methods). This matching allows for a seamless integration of OLAP and the inference engine. Typical methods would only focus on procedural execution (sequential execution) of OLAP queries, and then follow that procedural execution with rule engine processing.

Aggregations are declaratively defined since they are described as conditional patterns in service rules (in one embodiment service rules are the rules the system fires before the compliance rules). Consider the following compliance business rule: A money market account cannot own more than 5% of its total market value in technology. The aggregate objects (two in this case) return the total market value for the account and the total for the account for tech assets only. This information is then used by the compliance rules to check the 5% condition. The matching (of patterns against available data) is part of the engine's function, and the architecture of one embodiment of the present invention makes sure the system matches first on service rules and then compliance rules (which means in this cases, aggregates are created first and populated with the results from OLAP and then compliance rules are tested).

Another aspect of the invention is the fact that the rules are operating independently from the OLAP implementation. Declarative programs, such as certain rule-based programs, describe what the computer should do, but omit much of the instructions on how to do it, leaving the runtime system to fill in the blanks.

Service rules reuse the same RETE-based forward chaining rule execution mechanism as the business rules. The Rete algorithm is an efficient pattern-matching algorithm for implementing rule-based ("expert" systems). In other words, a RETE-based forward chaining rule execution mechanism is used to determine whether to execute a particular business rule for a given set of facts. Service rules use the same RETE-based forward chaining rule execution mechanism to determine an efficient way to access the data that is to be tested to determine if a particular business rule should be executed. The RETE algorithm provides a two-phase optimization of its network. The Rete algorithm is described in a paper by Charles Forgy entitled "Rete: A Fast Algorithm for the Many Pattern/Many Object Pattern Match Problem" published in Artificial Intelligence, 19, pp 17-37, 1982, and incorporated herein by reference in its entirety. Service rules contain conditions that are satisfied at runtime allowing the selection of which data to load, and filtering any unneeded data and objects.

The architecture appears as if there was a rule engine inside the rule engine. The present invention allows the engine running compliance rules to be driven by the inference process applied to metadata on accounts/portfolios, securities, and other business objects. When such meta-rules fire (one can refer to these meta-rules as service rules), they generate data objects in an efficient way (only the data needed is generated) allowing the compliance rules to be fired and the compliance-check to be executed. As noted above, FIG. 3A is a high-level diagram of the compliance analytics engine execution (runtime) environment. The path from Services Rules to the OLAP calculation implementation is supported by the Aggregate Sensor (shown as element 33 in FIG. 1B). The Aggregate Sensor acts as an object factory, used to create aggregate objects, integrated to the compliance domain object model.

Each aggregate class is generated using an OLAP multi-dimensional expression (MDX) query markup. MDX was created to query OLAP databases, and has become widely adopted within the realm of analytical applications. MDX is a standard for issuing queries to, and exchanging data with, multidimensional data sources. At runtime, the instantiation of each instance in the engine is what enables the implementation of the bridging between the rules and the OLAP queries, empowered by the choreography of Service Rules. In other words, once a rule is evaluated against the facts at a particular point in time, the service rules can efficiently access the necessary data based on the present state of the rule and the present state of the data by using the Rete algorithm. The instantiation and the evaluation of the rules enable the system to focus on specific OLAP cells at any point in time (an OLAP cell represents a single aggregate value in any dimension). The Service rules are efficient because they use the Rete algorithm to take advantage of the context data.

The Rete algorithm is a network linking all the conditions of the rules that are deployed in the compliance engine. Rete is a fundamental algorithm for production rule systems. The way Rete is structured, it remembers the instantiation of the conditions using the current facts, and therefore can decide which rules are ready, or are close to being ready, to fire. As an example, consider a rule that needs to check compliance for an account against a rule restricting trading in technology in certain countries. These conditions are used in service rules to only load specific data from the database for this account. Compliance rules are then applied only against the returned data as opposed to loading all the data related to that account, as is done by many other systems.

Service Rules help to satisfy the demanding performance and scalability requirements of portfolio compliance. Most data intensive applications make extensive use of data caching schemes in order to satisfy performance requirements. However, the open ended nature of user defined business rules combined with real-time changes to portfolio information and the need for scalability renders conventional data schemes inefficient and even counterproductive.

To amplify on this last point, user defined business rules can apply to arbitrary data sets and aggregations, and therefore data access patterns are typically unknown at design time (e.g., one organization may want to limit client portfolio investment in any security with more than 10% sales exposure in any one country except for those countries with GDP growth greater than 3%). In one embodiment, the compliance rules analytics engine design begins to get around the classic performance limitations of ad-hoc data analysis by leveraging the power of commercial OLAP engine technology to enable fast on-the-fly generation of arbitrary aggregations. An aggregation in the OLAP context is a composition technique for building a new object from one or more existing objects that support some or all of the new object's required interfaces.

One embodiment of the invention uses a Microsoft Analytic Services engine, e.g., one could purchase a Microsoft® SQL Server™ 2000 Analysis Services platform from Microsoft Corporation of Redmond, Wash. and load it onto a server as part of performing the methods of the present invention. Alternatively, other OLAP engines could be used to practice the present invention.

In addition, for every business rule defined the rule translator module generates a set of 'service' rules that define the data access rules associated with executing that business rule. The RT generates both service and business rules starting from the natural language. For each template rule mapped to the natural language expression, there is a corresponding service rule defining the data objects needed for such a template. The instantiation of the templates to real rules happens at translation time, and the instantiation and creation of data access objects happens at runtime as a result of the engine executing the service rules. In essence, the compliance engine 'caches' the data access strategy. Moreover, because the rules engine is RETE-based it naturally optimizes the data access strategy defined declarative in the service rules. A data access strategy in this context refers to the algorithm used to query and retrieve specific data from the database at a given point in time during the compliance check process. As an example, assume the system is checking compliance for a money market account. Since one embodiment of the system uses service rules (therefore declaratively stating the conditions for data access), the system can target specific data to load for this account only and not others. Further, this embodiment of the system will only load the data needed by the rules used by this account.

The RETE algorithm does not distinguish between 'business' logic rules and 'data access' logic rules and it optimizes them just the same. The optimization is a property of the algorithm itself. As noted above, the Rete algorithm is described in a paper by Charles Forgy entitled "Rete: A Fast Algorithm for the Many Pattern/Many Object Pattern Match Problem" published in Artificial Intelligence, 19, pp 17-37, 1982, and incorporated herein by reference in its entirety. The algorithm builds a network of nodes where each node represents the patterns or the conditions of each rule (this is the case for both the service rules and the compliance business rules of the present invention).

As noted above, the arbitrary nature of user defined business rules would make it difficult, if not a practical impossibility, to generate optimal data access schemes at design time.

The RT 102 translates service rules into CLIPS rules (shown in FIG. 2). More precisely, in one embodiment the RT 102 ultimately translates or compiles all rules as CLIPS rules. Thus, the RT 102 translates service rules to CLIPS format before the Rules.NET Engine executes the rules.

The following paragraphs describe the process of translating a rule from a UI RuleGist format to executable rules. One part of translation involves resolving the intent of a rule against the rule created by the editor.

Because of the natural language presentation of a rule, rules are open to interpretation, from simple rules with several conditions to complex rules with parenthetical.

The following steps explain in detail the process for creating rules using the UI RuleGist. In some cases, we refer to the implemented application classes. Details on each one of the classes are given in the next section. Some of these steps can be viewed as a recommendation on best practices:

1. Understand the possible permutations of a type or subtype of rules.
2. Generate several examples of the rule with different types of operators.
3. In the case of restriction rules, check to see if it allows highest, lowest or average operator. If it does, the rule may need to be treated as a calculated rule.
4. If a specific restriction rule has a condition, which is a calculated result, it may be a good idea to consider reclassifying the rule as calculated.
5. Use the RuleEditDemo to view the tree structure for the given rule.
6. If RuleGist returns "functionOperand", the grammar translator will need to parse all the parameters. Since there isn't a generalized representation of rules, each rule type has its own set of parameters. Rule subtypes may also have a different set of parameters.
7. If the rule allows nested statements, which is a combination of atomic conditions, and statements, grammar translator will have to parse the rule bottom up. Meaning, convert the ComparisonCondition that are nested deepest first. Then move to parent conditions above it.
8. Each comparisonCondition should be converted to an instance of Param object.
9. Once the rule has been parsed, BaseTemplate will need to convert the Param objects to Triplet objects. ParamAnd should be converted to TripletAnd. ParamOr should be converted to TripletOr, and Param should be converted to Triplet.
10. ClipsTransformer takes the RuleObjectModel and uses JessClips to generate Jess specific code. If a new rule type was added, ClipsTransformer may need to be updated, so that it calls any additional JessClips methods.
11. If a new domain object is introduced, it may not be necessary to update JessClips. The cases where JessClips needs to be updated are the following:
    a. The new object is used for calculated values or in restriction conditions
    b. The new object has an attribute which requires a new dimension in one of the cubes
    c. The new object inherits from another object. For example, MySecurity extends MxwsSecurity.
12. Changes to calculated rules may require changes to JessClips. Because OLAP is already a high level abstraction, it already covers a wide range of permutations. A significant change would most likely introduce new concepts or new types of calculations. A simple addition of a new security attribute as a dimension to an existing cube shouldn't require changes to how Aggregation object declarations are generated. Cases where JessClips may need changes include:
    a. A new aggregate object is introduced
    b. A new cube is introduced
    c. A new calculation is introduced
    d. A new way of comparing aggregates
13. Write new jess functions for any new calculations. A jess function is written in C#.NET and viewed from the rules simply as a standard function. Details on how to write such function are provided by the jess documentation along with examples,
14. Once the changes to ClipsTransformer, GrammarTranslator and JessClips are complete, you will need to update TransformDemo. The only changes needed in TransformDemo is adding an "else if" statement to look for any new rule type or uisubtype.
15. Build the C#.NET project TransformDemo as a console executable.
16. Run the executable using the rule.rule and ruleContext.xml file.
17. As a result of various tests, most likely, changes will be needed to make sure the translation works effectively and returns the expected results.
18. Once the rule translation works in the console, it will need to be integrated with the rule repository.

Steps for Generating Service Rules.

1. Parse the RuleGist condition objects as described in the previous section.
2. From within the ConvertCalculated method, make a call to existing service rule method. In the event, a new calculated rule needs a different kind of service rule, a new service rule method would be needed.
3. The first step is to write the service in text format and try it out. Once the service rule works, determine the best approach for generating the rule from the triplets.
4. Create a new method for generating the service rule.
5. Test the translation using TransformDemo class.
6. Once the ServiceRuleTranslator translates the service rule correctly, integrate with the rule repository.
7. Create a test rule using the rule editor and generate the clips rule using the translator.
8. Take the generated clips rule and run it in the compliance engine to verify the rule works correctly.

For a detailed description of how to parse RuleGist structure, please refer to the methods in GrammarTranslator. The GrammarTranslator is a class part of the overall RulGist UI Application (Rule editor). The file name is GrammarTranslator.cs and it is part of the computer program listings residing on each of the copies of the compact disc submitted with this document. One can find the GrammarTranslator.cs file on each copy of the compact disc at the following location:

--- xipws\Common\BLL\BusinessLogicPackages\RuleTranslator\GrammarTranslator.cs (a C# source file).

---

All of the methods have detailed comments, which explain how parsing works.

Required Assemblies

The following assemblies are required by the RuleTranslator.

DB.Client
OLAP.Client
DomainDataAcces
DomainObjects
RuleGist
RuleObjectModel
VDomain
VUtil Description of Core Classes This section provides an explanation of the core classes in RuleTranslator. It is meant to provide a high-to-medium level view of the responsibilities of each class.

GrammarTranslator

Responsible for parsing RuleGist structure for all rules and creating an array of Param Objects. For restriction rules, it parses the nested conditions first, producing a bottom up approach to parsing.
ClipsTransformer Responsible for calling the methods in JessClips. Contains the logic for generating the basic structure for all rules.
JessClips JessClips contains all the methods for generating jess specific clips statements for all rules. The class contains constants for most of the jess commands.
BaseTemplate BaseTemplate is the container for Param objects and translating Param objects to the equivalent Triplet object. This was done to decouple the UI and runtime format. In some cases, the Param's have to be massaged, so they fit the required format.
AbstractTemplate AbstractTemplate provides common implementation, so that one or more subclasses can extend it. One requirement is CompAlert rules will eventually have to be translated to the new format. Developers can easily extend the abstract class to read ComplAlert ResDef table and produce the correct Triplet objects.
ILogical Ilogical is the generic interface defining the methods for Logical operators. The types of logical operators are "and" conjunction and "or" disjunction.
RootLogical RootLogical is the base class which other logical classes extend. LeftHand extends RootLogical, since the rule object model must be able to express nested statements. GrammarTranslator is the primary class creating new instances of this class.
ParamAnd ParamAnd represents a parameter object that contains one or more atomic conditions or nested statements.
ParamOr ParamOr represents a parameter that contains one or more atomic conditions or nested statements that are logical disjunctions. GrammarTranslator is the primary class creating new instances of this class.
Triplet Triplet represents an atomic comparison between values. It is specifically a comparison of an object attribute, which is a single attribute with a data value of the same type.
TripletAnd TripletAnd represents a conjunction of one or more atomic conditions or nested statements. Template classes are the ones responsible for creating instances of triplet objects.
TripletOr TripletOr represents a disjunction of one or more atomic conditions or nested statements. Template classes are the ones responsible for creating instances of triplet objects.
IParam IParam is the generic interface describing Parameters.
ITransform ITransform is a simple interface that describes what a translator does. It transforms rules from one format to another format.
ServiceRuleService ServiceRuleService is responsible for using ListManagement and the repository manager to save implicit lists and service rules. This is necessary because the UI doesn't convert implicit lists to explicit lists. The service rules are required to query against the database and OLAP.
ServiceRuleTranslator ServiceRuleTranslator is responsible for taking the translated Triplets and generating the correct service rule for the given calculated rule. In some cases, there may be more than one service rule.
ITriplet ITriplet defines an atomic condition.

Knowledge Maintenance Framework (KMF)

With reference to FIGS. 6A and 6B, a Knowledge Maintenance Framework (KMF) integrates the OLAP cube models, MDX queries, Service Rules, Business Rules, the Object Oriented domain representation, and the Relational Domain Model into a common semantic platform. FIGS. 6A and 6B represent one embodiment of a design of the system's knowledge structure. This design defines the data store of elements of the KMF as well as the operation of the system. In connecting 6A and 6B to FIGS. 1 and 2, the knowledge structure relates to the data access/server and BL components (FIG. 1) and to the editor (FIG. 2). FIG. 2 illustrates one embodiment of a compliance check process including the editing (starting with the user entering rules using the editor) to the translation to the internal representation of rules to the runtime where a compliance status is generated. The overall structure of the system is shown in FIG. 1.

With the KMF, the present invention provides a semantic integration of all the elements in use. The present invention does not have separate concepts, used in completely different ways and concepts 'meaning' different things in each model. To clarify, one embodiment of the system uses a single XML schema (tree structure) to include all the elements making the 'knowledge base' of the present compliance system. For example, one embodiment of the KMF includes rules, sql queries, OLAP MDX queries, all in the same uniform representation.

In one embodiment, the Rules Analytics Engine integrates a variety of best-of-breed information processing technologies, e.g., MDX queries, OLAP and Rules.Net, the .Net implementation of Jess (In addition to those technologies already mentioned above, one can obtain SQL Server, Net development tools, and C# programming language from Microsoft Corporation of Redmond, Wash.). Each of the information processing technologies performs a certain kind of function, and each supports a different model of operation with proprietary semantics. Many of these technologies have not been adopted widely enough to be subject to robust industry standardization. The semantic integration challenge implied by the combination of these technologies is likely a major reason why other organizations have not successfully pursued the approach implemented by the present invention. Integration is always a difficult task requiring advanced technology. In this invention, multidimensional data and multiple sources add to the challenge. Semantic integration challenges include the translation of meaning from one model to another (for example the queries described in OLAP, the way the system uses the queries in rules, and how the user understands the queries). Another example of a semantic challenge in compliance systems is translating from one data source's interpretation to another. The integration of the meaning from one source to another is a challenge. Declarative systems as supported in this invention help alleviate such issues because logical expressions, conditions, and other types of information, are described declaratively and not encoded in procedures.

The framework of FIGS. 6A and 6B includes an MDX markup language capable of supporting a platform, programming language, and platform-neutral OLAP statements. Platform in this context means software platform/software environment. One example of a platform for use with the invention is Microsoft SQL Server 2000 Analysis Services. The expressiveness of the rule language is empowered by an extension to MDX query support (the extension is achieved using an extensible markup language (XML) schema) The XML schema can be used to write extended MDX queries. An MDX knowledge base defines and implements a set of generic templates used to generate OLAP queries in a platform independent manner. The queries can be represented in an OLAP language and in the C# programming language. An MDX utility facilitates not only the editing and navigation of queries, but also the testing and tuning of the performance of each query template. The MDX utility is a conventional application written in C#. It allows the testing of MDX queries using conventional calls to OLAP systems. One can take the same MDX queries and run them directly in the OLAP system of their choice. FIGS. 6A and 6B illustrate the structure of the Knowledge Management Framework and the schema used to support OLAP integration.

One embodiment of the invention provides a flexible mechanism allowing the definition, representation and deployment of MDX statements as part of the MLC knowledge base, which includes business rules for compliance and domain data and metadata.

One embodiment of the invention provides an XML markup for MDX queries with an object-centered approach. An XML document according to the invention integrates MDX statements, Rules and other SQL statements together in the same environment (An MLC XML document contains rules, metadata, mdx and sql)

An XSL transformer implements the translation layer from XML to MDX statements for execution. The MDX template navigator, used to view and edit the list of available templates and their contents, is similar to the explorer interface in windows. In one embodiment, a feature is added to test and monitor the performance of each query and compare any changes that have been made and their performance with the previous version. The XSL transformer is written in standard XSL. Given the MDX XML schema, one can write an XSL translator. The template navigator is a conventional C# application.

The MDX markup language is a subset of the overall knowledge base markup, shown in FIG. 6A. MlcKnowledgeStore 138 is one embodiment of a root element of an information set according to the invention, the information set including data, metadata, queries and rules. More specifically, MlcKnowledgeStore 138 is a sequence of rulebase elements 140, olapquerybase elements 142, sqlquerybase elements 146, domaindata elements 148, and domainmetadata elements 150 (which is in turn a sequence of metadata elements 152).

The MDX subset starts with '<olapquerybase>' 142 as its main root element. It is a sequence, possibly empty, of mdxquery elements. Each '<mdxquery>' element 144 represents a single mdx statement. With reference to FIG. 6B, element 144 is a made of a header 154, a body 164, and a list of query parameters 168. Optionally, it may also include a query test element '<qtest>' 176, used for testing purposes.

The MDX markup goes beyond any published markup related to OLAP.

One embodiment of the detailed MDX tree hierarchy is shown in more detail in FIG. 6B.

MDX XML Schema

The XML schema is defined in an object-centered fashion.
<olapquerybase> 142

The '<olapquerybase>' element is the root element. It is a container for the sequence of MDX queries. It can also be empty since MLC knowledge bases may have no defined OLAP queries initially.
<mdxquery> 144

The '<mdxquery>' element is defined as an optional and unbounded sequence of mdx queries. Each '<mdxquery>' element is itself a sequence of three elements: '<header>', '<body>', and '<qparams>'. An optional fourth element '<qtest>' is available for testing purposes.

<header> 154

The header element represents the header information for a given mdx query. It is used for C# code generation. Each header includes a parameter (optional), a description (header summary), and return values (<hreturn> element).

<hparam> 156

The '<hparam>' element is an optional element, describing declared header parameters. This element has two attributes: name and type. The name is used for the parameter name and the type is used for the corresponding data type. In the following example, one declares the parameter 'MeasureID' of type Integer:

<hparam name="MeasureID" type="int">

<hsummary> 158

The '<hsumarry>' element contains the description and comment for the defined query, as shown in this example:

<hsummary> Select a measure by crossjoin of members</hsummary>

<hreturn> 160

The '<hreturn>' element contains a sequence of '<hcolumn>' elements, where each one of them represents a value returned by the execution of the mdx query. Here is an example with two columns: 'Members' and 'MeasureID':

```
<hreturn>
    <hcolumn name="Members" />
    <hcolumn name="MeasureID">
</hreturn>
```

<hcolumn> 162

The '<hcolumn>' element is a single element with and the name attribute representing the name of the return declared column.

EXAMPLE

<hcolumn name="Count"/>

<body> 164

The '<body>' element is the main mdx query element. It contains the query statement itself. This is similar to the body of a rule in the sense that it defines the conditions for the query.

This element contains a non-empty sequence of query items ('<qitem>' element in the MLC MDX schema). Example of markup:

```
<body>
    <qitem code="mdx"> WHERE </qitem>
    <qitem code="attr" name="PositionCube"></qitem>
    <qitem code="attr" name="Slice"></qitem>
</body>
```

<qitem> 166

Each '<qitem>' element defines a query item, part of the mdx statement. A '<qitem>' element contains two attribute: The attribute code and the attribute name. The code can be either a mdx keyword such as 'WHERE' or an attribute name. Here is an example:

```
<qitem code="mdx"> WHERE </qitem>
<qitem code="attr" name="PositionCube"></qitem>
```

<qparams> 168

The '<qparams>' element is a container for the sequence of declared parameters for the mdx query. These parameters are referenced and used in the body of the mdx query.

<qparam> 170

The '<qparam>' element has two attributes: type and name to represent the type and the name of each declared query parameter, respectively. A third attribute, 'members', is optional. The example below illustrates that some query parameters include an optional '<tuple>' element.

```
<qparams>
    <qparam type="cube" name="PositionCube" />
    <qparam type="measure" name="MeasureID" />
    <qparam type="dimension" name="SliceDim" />
    <qparam type="crossjoin" name="SetCrossjoin"></qparam>
    <qparam type="crossjoin" name="SetCrossjoinSun"></qparam>
    <qparam type="set" name="Slice" members="one">
        <tuple>
            <dimension name="SliceDim" />
        </tuple>
    </qparam>
</qparams>
```

<tuple> 172

The '<tuple>' element is defined by the '<qparam>' element with the attribute 'members'. It allows the declaration of a dimension. Here is an example of the markup:

```
<tuple>
    <dimension name="SliceDim" />
</tuple>
```

<dimension> 174

The '<dimension>' element is defined as part of a '<tuple>' element, itself defined within a '<qparam>' element. It has one attribute, name. Markup example:

<dimension name="SliceDim"/>

<qtest> 176

The '<qtest>' element is defined for testing purposes only. As such, it is not a required element for the mdx query to be valid with regards to the MLC MDX schema. The '<qtest>' element contains a sequence of test parameters.

<tparams> 178

The '<tparams>' element is the container of all '<tparam>' elements.

<tparam>

The '<tparam>' element is a declaration of a single test parameter for the test query element. Some test parameters are fairly simple and define the parameter name and its corresponding value, as shown in the following example:

```
<tparam name="Count">
    <tparamval>10</tparamval>
</tparam>
```

Others may include an inclusion or exclusion property when lists are involved (for example, when the parameter is country excluding certain countries), as illustrated in this example:

```
<tparam name="Country">
    <tparamval>[Country].[Country Code]</tparamval>
    <tparammember type='exclude'>
        <item>[FR]</item>
        <item>[DE]</item>
    </tparammember>
</tparam>
```

<tparamval> 184

The '<tparamval>' element contains the value corresponding to the parent element (test parameter name).

EXAMPLE

<tparamval>[Industry].[Industry]</tparamval>
<tparammember> 180

The '<tparammember>' element is used once exclusion or inclusion lists are involved in the definition of the values corresponding to the test parameter (parent element). Here is an example:

```
<tparammember type='include'>
    <item>[FUN]</item>
    <item>[CNS]</item>
</tparammember>
```

<item> 182

The '<item>' element is used to list a collection of values as part of an exclusion or an inclusion list, as shown in the example in section 3.1.18.

The knowledge elements defined in FIG. 6A are the basis of the design and implementation of the repository. They are stored in the database 140 shown in FIG. 1B.

With reference to FIG. 4, a user can enter a rule via a Rule Editor User Interface (UI). In the illustrated example, the user has specified via a set of inputs, e.g., drop-down menus and input fields, the following rule: "The weight based on Net Assets of investments where SecurityAssetCode is equal to CS must be less than 70%."

One of the available representations for each rule is its "text representation", accessible from the Rule Editor. This is intended to be as close to the natural language expression of that rule as possible. Once the above rule is entered, its text representation is:

"The weight based on Net Assets of investments where SecurityAssetCode is equal to CS must be less than 70%"
Rule Gist (a Rule Object Model)

The Rule Gist is the internal extensible markup language (XML) representation that the Editor and the Translator use to communicate with each other. As noted above, Appendix II provides one embodiment of a rule grammar specification for a structured standard grammar language close to Backus Naur form (BNF) standard syntax. Using this specification, a person of ordinary skill in the art can create a rule editor and a natural language grammar that support the rule expressions provided in the compliance engine of the present invention.

The Rule Gist XML representation is a hierarchical form that captures the structure of the rule along with all referenced values used by the editor. In our example the generated Rule Gist file is:

```
<RuleGist ruleTypeID="MinMaxRange">
    <RuleData>
        <Factor factor="weight">
            <denominator name="net assets" />
        </Factor>
        <Scope code="Investments">
            <RExpr>
                <FirstExpr>
                    <LExprElements>
                        <LExprElement openingParentheses="0"
closingParentheses="0" negated="false" jointType="None">
                            <Predicate useQClause="false"
attribute="SecurityAssetCode">
                                <Clause>
                                    <Comparison firstValue="CS">
                                        <Comparator chosen="1" />
                                    </Comparison>
                                </Clause>
                            </Predicate>
                        </LExprElement>
                    </LExprElements>
                </FirstExpr>
            </RExpr>
        </Scope>
        <Comparison firstValue="70">
            <Comparator chosen="4" />
        </Comparison>
    </RuleData>
</RuleGist>
```

CLIPS Rule Set

As noted above, one of the Rule Translator's outputs is a set of CLIPS rules representing the translated Compliance Rule. The generated set in our example is attached here:
Simple Service rule that creates an internal list of all the referenced Security Asset Codes (in this case it's just the one-element list {CS}; additional AND/OR clauses in the original rule would cause this list to grow

```
; List Creation Service Rule
(defrule list_C1_0
    (MLCDomain_XipBusinessObjectSet
        (OBJECT ?xbos)
    )
=>
    (create-lists ?xbos "C1" SecurityAssetCode:1:CS)
)
```

This service rule is responsible for fetching the weight based on Net Assets for all CS-type holdings for the given combination of account/process stage (input parameters). Once the left hand side (LHS) is a match (depending on whether the rule is assigned to this account, the account holds such securities etc), the RHS invokes the right variation of the create-aggregate function that implements the actual MDX query.

```
;; Aggregate Fetching Service Rule
(defrule qry_C1
    (MLCDomain_XipBusinessObjectSet
        (OBJECT ?xbos)
    )
    (MLCDomain_AggregationFactory
        (OBJECT ?aggrfac)
    )
    (MLCDomain_MxwsModifiedAccount
        (userCode ?userCode)
```

```
            (accountCode ?accountCode)
            (OBJECT ?modAcc)
        )
        ;; Fetch the account list for rule "C1" to see if it's
applicable
        (MLCDomain_MxwsDataList
            (ruleCode "C1")
            (exclude FALSE)
            (listBasis 0)
            (OBJECT ?aclist)
        )
        ;; call isMember to test, only continue if this rule
applies
        ;; to ?accountCode (coming from the IMS message)
        (test (call ?aclist isMember ?accountCode) )
        (MLCDomain_MxwsSecurity
            (securityCode ?tick)
            (securityAssetCode ?securityAssetCode)
        )
        (MLCDomain_MxwsDataList
            (ruleCode "C1")
            (listBasis 7)
            (OBJECT ?list0)
        )
        (test (call ?list0 isMember ?securityAssetCode) )
        (not
            (MLCDomain_Aggregation
                (key "11.3.0.7.F")
                (sliceValue ?accountCode)
            )
        )
    =>
        (create-aggregate2 ?aggrfac ?modAcc "11.3.0.7.F" "3"
"accountCode" ?acco
untCode ?list0)
)
```

The following service rule creates a "Condition" object with all required rule information:

```
;; Condition creation service rule
(defrule compare_C1
    (MLCDomain_XipBusinessObjectSet
        (OBJECT ?xbos)
    )
    ;; we will match on compare object
    (not
        (MLCDomain_Compare
            (ruleCode "C1")
        )
    )
=>
    ;; create compare object
    (bind ?compare (new MLCDomain.Compare) )
    (call ?compare setRuleCode "C1")
    (call ?compare setRuleType "Min/Max/Range")
    (call ?compare setExceptionOperator "less than" "70")
    (definstance MLCDomain_Compare ?compare)
)
```

Finally, the Terminal Rule matches all the intermediate facts (it will not fire until the proper MLC_Compare and MLC_Aggregation objects are generated by the above service rules). If the condition is not met (checked by the "test" call at the bottom of the LHS), the RHS will invoke the create-exception function along with all Exception Event Data needed.

```
;; Terminal Rule
(defrule C1
    (MLCDomain_XipBusinessObjectSet
        (OBJECT ?xbos)
    )
    (MLCDomain_MxwsModifiedAccount
        (userCode ?userCode)
        (accountCode ?accountCode)
        (OBJECT ?modAcc)
    )
    ;; we use DataList to test if the account applies
    (MLCDomain_MxwsDataList
        (ruleCode "C1")
        (exclude FALSE)
        (listBasis 0)
        (OBJECT ?aclist)
    )
    ;; call isMember to test
    (test (call ?aclist isMember ?accountCode) )
    (MLCDomain_Compare
        (ruleCode "C1")
        (OBJECT ?compare)
    )
    (MLCDomain_Aggregation
        (sliceValue ?accountCode)
        (measure ?accTotal)
        (newMeasure ?aggNTV)
        (key "10.3.0")
        (OBJECT ?accAggrTV)
    )
    (MLCDomain_Aggregation
        (sliceValue ?accountCode)
        (measure ?aggTV0)
        (newMeasure ?newTV0)
        (key "11.3.0.7.F")
        (OBJECT ?accAggr0)
    )
    (test (call ?compare check ?accAggr0 ?accAggrTV) )
=>
    ;; create the exception event object
    (create-exception2 ?xbos "C1" "0.1" ?modAcc ?aclist ""
70 "C" "MLCDomain_Compare"
?compare "MLCDomain_Aggregation" ?accAggr0
"MLCDomain_Aggregation" ?ac
cAggrTV)
)
```

From a technology perspective, the present invention overcomes current problems associated with developing real-time flexible and scalable portfolio compliance systems. The invention overcomes these problems through the successful integration of declarative rules and OLAP technologies. Service Rules and the Knowledge Maintenance Framework facilitate this success. The present invention integrates OLAP and Rules technologies to achieve scalable real-time execution performance while maintaining a semantic range that is flexible enough to support user defined business rules. In other words, one embodiment of the present invention integrates RETE-base rules systems, OLAP systems. RDBMS systems, Web Services, Object Oriented Systems and procedural 3GLs (e.g. C#).

Having thus described at least one illustrative embodiment of the invention, various alterations, modifications and improvements are contemplated by the invention. Such alterations, modifications and improvements are intended to be within the scope and spirit of the invention. Accordingly, the foregoing description is by way of example only and is not intended as limiting. The invention's limit is defined only in the following claims and the equivalents thereto.

We claim:

1. A system for enforcing rules-based portfolio compliance, said system comprising:
    a compliance rules computer coupled with an electronic data network and configured to maintain computer accessible data for a plurality of portfolio compliance rules; and a compliance-engine computer server coupled with said electronic data network and configured to execute a compliance analytics engine (CAE) operative to receive from an order management system (OMS) via said electronic data network, an electronic request to evaluate compliance of a set of proposed electronic trade orders stored on said OMS prior to execution of said trade orders, to access said plurality of portfolio compliance rules maintained on said compliance rules computer server, to perform a compliance evaluation of said set of proposed electronic orders based at least in part on the portfolio compliance rules, and to generate an electronic message including data for one or more violations of the portfolio compliance rules to the OMS based upon said evaluation, wherein said CAE is configured to perform said compliance evaluation using, at least in part, a RETE-based process.

2. A computer implemented method of providing rules-based portfolio compliance comprising steps of:
providing a data server coupled with an electronic data network and configured to maintain computer accessible data;
storing computer accessible data for a plurality of portfolio compliance rules on said data server;
providing a computer server coupled with said electronic data network; and
programming said computer server with executable instructions to configure said computer server to execute a compliance analytics engine (CAE) operative to receive from an order management system (OMS) via said electronic data network, an electronic request to evaluate compliance of a set of proposed electronic trade orders stored on said OMS prior to execution of said trade orders, to access said plurality of portfolio compliance rules, to perform a compliance evaluation of said set of proposed electronic orders based at least in part on the portfolio compliance rules, and to generate an electronic message including data for one or more violations of the portfolio compliance rules to the OMS based upon said evaluation, wherein said compliance evaluation is performed using, at least in part, a RETE-based process.

3. A system for enforcing rules-based portfolio compliance, said system comprising:
means for storing computer accessible data for a plurality of portfolio compliance rules on a data server;
means for providing a computer server coupled with said electronic data network; and
means for programming said computer server with executable instructions to configure said computer server to execute a compliance analytics engine (CAE) operative to receive from an order management system (OMS) via said electronic data network, an electronic request to evaluate compliance of a set of proposed electronic trade orders stored on said OMS prior to execution of said trade orders, to access said plurality of portfolio compliance rules, to perform a compliance evaluation of said set of proposed electronic orders based at least in part on the portfolio compliance rules, and to generate an electronic message including data for one or more violations of the portfolio compliance rules to the OMS based upon said evaluation, wherein said means for programming said computer server is further configured to program said computer server to perform said compliance evaluation using, at least in part, a RETE-based process.

4. The system according to claim 3, further comprising means for receiving natural language compliance rules and translating said natural language compliance rules into computer-executable portfolio compliance rules, and storing said portfolio compliance rules said data server.

* * * * *